(12) United States Patent
Collings et al.

(10) Patent No.: US 10,067,471 B2
(45) Date of Patent: Sep. 4, 2018

(54) APPARATUS AND METHODS FOR LIGHT BEAM ROUTING IN TELECOMMUNICATION

(71) Applicant: Cambridge Enterprise Limited, Cambridge (GB)

(72) Inventors: Neil Collings, Cambridge (GB); Andreas Georgiou, Larnaka (CY); Maura Michelle Redmond, Cambridge (GB); Brian Robertson, Cambridge (GB); Jinsong Liu, Edinburgh (GB); William Crossland, Harlow (GB); John Richard Moore, Barton (GB); Daping Chu, Cambridge (GB)

(73) Assignee: CAMBRIDGE ENTERPRISE LIMITED, Cambridge (GB)

( * ) Notice: Subject to any disclaimer, the term of this patent is extended or adjusted under 35 U.S.C. 154(b) by 0 days.

(21) Appl. No.: 15/384,280

(22) Filed: Dec. 19, 2016

(65) Prior Publication Data

US 2017/0315507 A1 Nov. 2, 2017

Related U.S. Application Data

(63) Continuation of application No. 14/000,203, filed as application No. PCT/GB2012/050340 on Feb. 15, 2012, now Pat. No. 9,547,276.

(30) Foreign Application Priority Data

Feb. 16, 2011 (GB) .................................. 1102715.8

(51) Int. Cl.
*G03H 1/08* (2006.01)
*H04Q 11/00* (2006.01)
(Continued)

(52) U.S. Cl.
CPC ............. *G03H 1/0841* (2013.01); *G02B 5/32* (2013.01); *G03H 1/0808* (2013.01);
(Continued)

(58) Field of Classification Search
CPC .. G03H 1/0841; G03H 1/0808; G03H 1/2294; G03H 2210/44; G03H 2226/02;
(Continued)

(56) References Cited

U.S. PATENT DOCUMENTS 5,416,616 A 5/1995 Jenkins et al.
5,617,227 A 4/1997 De Bougrenet De La Tocnaye et al.
(Continued)

FOREIGN PATENT DOCUMENTS

CN 101889238 A 11/2010
GB 2438026 A 11/2007
(Continued)

OTHER PUBLICATIONS

Collings, et al., "The Applications and Technology of Phase-Only Liquid Crylstal on Silicon Devices", "Journal of Display Technology", Jul. 26, 2010, pp. 112-119, vol. 7, No. 30, Publisher: IEEE, Published in: US.
(Continued)

*Primary Examiner* — Leslie C Pascal
(74) *Attorney, Agent, or Firm* — Loginov & Associates; William A. Loginov

(57) ABSTRACT

A LCOS routing device, comprising: an optical input and plurality of optical outputs; a spatial light modulator (SLM) between said input and output, for displaying a kinoform; a data processor, configured to provide kinoform data for displaying said kinoform on said SLM. Said data processor inputs routing and calculates said kinoform data. Said data processor calculates kinoform data by: determining an initial
(Continued)

phase pattern for said kinoform; calculating a replay field of said phase pattern; modifying an amplitude component of said replay field, retaining a phase component of said replay field to provide an updated replay field; performing a space-frequency transform on said updated replay field to determine an updated phase pattern for said kinoform; and repeating said calculating and updating of said replay field and said performing of said space-frequency transform until said kinoform for display is determined; and outputting said kinoform data for display on said LCOS SLM.

14 Claims, 11 Drawing Sheets

(51) Int. Cl.
G03H 1/22 (2006.01)
G02B 5/32 (2006.01)
G02B 6/35 (2006.01)
G02F 1/1362 (2006.01)

(52) U.S. Cl.
CPC ....... *G03H 1/2294* (2013.01); *H04Q 11/0005* (2013.01); *G02B 6/3558* (2013.01); *G02B 6/3588* (2013.01); *G02F 1/136277* (2013.01); *G03H 2001/085* (2013.01); *G03H 2001/0816* (2013.01); *G03H 2210/44* (2013.01); *G03H 2222/31* (2013.01); *G03H 2225/32* (2013.01); *G03H 2225/60* (2013.01); *G03H 2226/02* (2013.01)

(58) Field of Classification Search
CPC ..... G03H 2001/085; G03H 2001/0816; G03H 2225/32; G03H 2225/60; H04Q 11/0005; G02B 5/32; G02B 6/3588; G02B 6/3558; G02F 1/136277
See application file for complete search history.

(56) References Cited

U.S. PATENT DOCUMENTS

| 7,457,547 | B2 | 11/2008 | Frisken et al. |
| 9,547,276 | B2* | 1/2017 | Collings ............... G03H 1/0808 |
| 2001/0050787 | A1* | 12/2001 | Crossland ............... G02F 1/292 |
| | | | 359/15 |
| 2007/0070477 | A1 | 3/2007 | Eto et al. |
| 2010/0295836 | A1 | 11/2010 | Matsumoto et al. |
| 2014/0036182 | A1 | 2/2014 | Matsumoto et al. |
| 2014/0036206 | A1 | 2/2014 | Otsu et al. |

FOREIGN PATENT DOCUMENTS

| JP | 2005-309286 | 11/2005 |
| JP | 2007-011153 | 1/2007 |
| JP | 2009-536748 A | 10/2009 |
| WO | 03021341 A2 | 3/2003 |
| WO | 2007131650 A1 | 11/2007 |

OTHER PUBLICATIONS

Dufresne, et al., "Computer-Generated Holographic Optical Tweezer Arrays", "Review of Scientific Instruments", Mar. 2001, pp. 1810-1816, vol. 72, No. 3, Publisher: American Institute of Physics, Published in: US.

Dorsch, et al., "Fresnel Ping-Pong Algorithm for Two-Plane Computer-Generated Hologram Display", "Applied Optics", Feb. 10, 1994, pp. 869-875, vol. 33, No. 5, Publisher: Optical Society of America, Published in: US.

Georgiou, et al., "Hologram Optimisation Using Liquid Crystal Modelling", "Molecular Crystals and Liquid Crystals", 2005, pp. 511-526, vol. 434, Published in: US.

Bernau, "Improved Hologram Calculation for Correlated Video Frames", "Digest of Technical Papers", 2010, pp. 507-508, Publisher: IEEE, Published in: US.

Liu, et al., "Iterative Algorithm for the Design of Diffractive Phase Elements for Laser Beam Shaping", "Optics Letters", Aug. 15, 2002, pp. 1463-1465, vol. 27, No. 16, Publisher: Optical Society of America, Published in: US.

* cited by examiner

APPARATUS AND METHODS FOR LIGHT BEAM ROUTING IN TELECOMMUNICATION

RELATED APPLICATIONS

This application is a continuation of co-pending U.S. patent application Ser. No. 14/000,203, filed May 8, 2015, entitled Apparatus and methods, which is a national stage entry of PCTGB2012050340, filed Feb. 15, 2012, which claims priority to GB 1102715.8, filed Feb. 16, 2011, the entire disclosure of which is herein incorporated by reference.

FIELD OF THE INVENTION

This invention relates to methods and apparatus for routing light beams in telecommunications devices using holographic techniques. In particular aspects of the invention relating to displaying kinoforms on LCOS (Liquid crystal on silicon) devices.

BACKGROUND TO THE INVENTION

The use of holographic techniques, in particular kinoforms (phase only holograms) in telecommunications presents special problems, in particular because of the high signal-to-noise (SNR)/low crosstalk requirements as compared with display applications. For example in a display application the level of noise/crosstalk may be of order 1:300 whereas in a telecommunications device it may be of order 1:10000. other special problems which can arise are as follows:

- Operation at the long wavelength of 1.5 micron necessitates the use of thick liquid layers (compared with visible light devices), making the accurate rendition of the pixel array pattern in the liquid crystal more difficult.
- High diffraction efficiency and very low crosstalk are required.
- Reconfigurable dynamic pixilated kinoforms rendered on LCOS devices have special problems compared with fixed kinoforms produced by photolithographic processes. They have a relatively large pixel size and the size of the pixel array is limited and they suffer from artefacts related to the liquid crystal layer.
- In some cases relatively fast computation of pixel patterns is required e.g. to adaptively adjust beams or the configure new switch configurations.

Background prior art can be found in U.S. Pat. No. 5,617,227; U.S. Pat. No. 5,416,616; WO03/021341; U.S. Pat. No. 7,457,547; and "Iterative algorithm for the design of diffractive phase elements for laser beam shaping", J. S. Liu and M. R. Taghizadeh, Aug. 15, 2002, Vol. 27, No. 16, OPTICS LETTERS p. 1463; "Hologram Optimisation Using Liquid Crystal Modelling", Georgiou A. G. et al., Molecular Crystals and Liquid Crystals 2005 vol 434 pp 511-526; and "Fresnel ping-pong algorithm for two-plane computer-generated hologram display" in 10 Feb. 1994/Vol. 33, No. 5/APPLIED OPTICS pp. 869).

SUMMARY OF THE INVENTION

According to the present invention there is therefore provided a LCOS (liquid crystal on silicon) telecommunications light beam routing device, the device comprising: an optical input; a plurality of optical outputs; a LCOS spatial light modulator (SLM) in an optical path between said input and said output, for displaying a kinoform; a data processor, coupled to said SLM, configured to provide kinoform data for displaying said kinoform on said SLM; wherein said kinoform data defines a kinoform which routes a beam from said optical input to a selected said optical output; wherein said data processor is configured to input routing data defining said selected optical output and to calculate said kinoform data for routing said beam responsive to said routing data; and wherein said data processor is configured to calculate said kinoform data by: determining an initial phase pattern for said kinoform; calculating a replay field of said phase pattern; modifying an amplitude component of said replay field to represent a target replay field for said beam routing, retaining a phase component of said replay field to provide an updated replay field; performing a space-frequency transform on said updated replay field to determine an updated phase pattern for said kinoform; and repeating said calculating and updating of said replay field and said performing of said space-frequency transform until said kinoform for display is determined; and outputting said kinoform data for display on said LCOS SLM.

In embodiments, using the above described procedure enables real time kinoform calculation, even in a system with a large number of outputs and/or where the hologram has a large number of pixels. For example the kinoform may be calculated in a few tens of milliseconds, particularly where the space-frequency transform is implemented as a hardware fast Fourier transform. Embodiments of the procedure also facilitate the application of various additional techniques for reducing crosstalk and improving the signal-to-noise ratio, which is important for telecommunications.

Thus in one preferred embodiment the data processor is configured to modify the phase pattern of the kinoform in response to data defining a model of a response of the LCOS spatial light modulator prior to calculating the replay field of the phase pattern. Broadly speaking, this enables a rapid calculation to be performed in which the response of a physical liquid crystal material is modelled so that the non-ideal response can be corrected in one or more subsequent iterations of the kinoform calculation procedure. This facilitates more accurate information and crosstalk reduction. A procedure for compensating for a phase response of a liquid crystal is described in Georgio et al (ibid), and such a procedure may be used here.

Embodiments of the kinoform calculation procedure also enable 'overcompensation' of the target replay field to which the calculated replay field is modified, the overcompensation being such that the iterative kinoform determination process converges faster than it would otherwise. This can be achieved by adjusting the amplitude component of the target replay field, for example using the procedure described in Liu et al (ibid), using a modified fourier-domain constraint function, discussed further in "Symmetrical iterative Fourier-transform algorithm using both phase and amplitude freedom for the design of diffractive beam shaping elements", Lui et al., 2005 Conference on Lasers and Electro-Optics Europe, SPIE, at page 610. In embodiments of the procedure the calculated amplitude component of the replay field is replaced by the desired (amplitude) replay field, but in other approaches the calculated replay field may simply be modified to more accurately represent the desired, target replay field.

The kinoform calculation procedure also enables redistribution of noise, spatially in the replay field, away from the selected output. For example this may be achieved by expanding the replay field used in the iterative kinoform calculation procedure so that it is greater than the actual replay field used by the routing device. The actual replay field may be defined by a perimeter defined by the plurality of optical outputs, in the replay field, but if a larger target replay field is used for the kinoform calculation then the replay field noise is spread out over this larger area, thus reducing the noise in the portion of the replay field actually used in the device (the skilled person will appreciate that, in embodiments, the optical outputs may be defined by a set of optical fibre inputs to optical fibres which lead away from the device). More particularly, the "don't care" area may comprise all the output field other than the optical outputs. This is a considerable advantage compared to the case of holographic projection for display purposes. In practical implementation there is a balance between the size of the replay field used in the calculation and the time taken for the calculation (and also the termination point of the iteration, which will generally be when the average error is less than a threshold level).

In embodiments of the device one or more of the optical outputs may be monitored to determine an optical signal level, and then the target replay field may be adjusted, responsive to this, to optimise a coupling between the routed beam and an optical output. For example the overlap integral between the replay field and optical output (fibre optic input) may be maximised. This may, for example, be performed as a calibration procedure and/or in response to changes in temperature or time, for example at intervals. Optionally more than one such replay field calibration may be employed for more than one temperature range, in which case the device may include a temperature sensor to select the range/calibration. It will be recognised that since in general the output ports will have very similar responses, only one output port need be monitored and 'calibrated' in this way to determine a 'calibration' for the device.

In further embodiments the calculation of the kinoform/replay field may include modifying the amplitude component of the target replay field to compensate for an envelope amplitude variation in the replay field. This is typically a sin c function in two dimensions, resulting from the light diffraction atom of an individual pixel of the LCOS SLM. For example the amplitude of a beam deflected to a central portion of the replay field may deliberately be attenuated so that the amplitude of the beam when directed to a portion of the replay field away from the centre or optic axis has a similar or substantially the same amplitude.

Embodiments of the device may incorporate channel attenuation and/or equalisation, for example by modifying the desired target replay field to modify the desired amplitude of an output beam. The ability to control the attenuation of a beam in a telecommunications device is an important advantage.

In embodiments a plurality of inputs rather than just a single input may be provided, and in a general case, n input beams may be mapped to n output beams.

Either or both of an input and output to the device may be bi-directional. The skilled person will appreciate that the inputs and outputs may be exchanged so that the invention also provides, in embodiments an n to 1 multiplexer. A multiplexer and de-multiplexer may, in principle, be combined in a single device. Embodiments of the device are thus suitable for multicast applications.

An LCOS spatial light modulator in general has sufficient pixels for a plurality of kinoforms to be displayed upon a single device or die. Potentially hundreds of kinoforms may be displayed on a single LCOS device. Thus, in embodiments, the device may be configured to implement a set of beam routing functions using separate kinoforms displayed on a single LCOS device, for example to provide a set of beam routing/switching devices with shared optical components, for compact physical implementation.

In some preferred embodiments the device includes a Fourier transfer lens between the kinoform and replay plane; this may be corrected for chromatic aberration. In embodiments the LCOS SLM is a reflective SLM, the optical input(s) and output(s) are in substantially the same plane, and the Fourier transform lens is between the SLM and the input/output plane.

In some embodiments of the device the calculation of the kinoform is optimised for a particular wavelength, for example around 1.5 microns, but in other embodiments the calculation of the kinoform may be optimised over a band of wavelengths, for example the optimal C-band (1530-1565 nm) and/or L-band, (1565-1625 nm). This latter approach is advantageous as the device can then be fabricated to be substantially wavelength agnostic, at least over a band of optical wavelengths, for example of at least 10, 20, 30, 50 or 100 nm.

In embodiments of the device, and method described below, the target replay field may be chosen to perform a soft switch of the output beam from one position to another. This may be achieved by, when changing the selected optical output, defining a desired or target replay field which transitions from a current replay field or optical output to the desired or target replay field or optical output via one or more transitional stages or replay fields in which the currently selected output is attenuated and/or in which the new selected output is at an intermediate amplitude between zero and its desired (full output) level. In embodiments a sequence of target replay fields may be employed to provide a smooth transition from one optical output to another, for example by fading one output down and another up. With such an approach it is particularly helpful to inherit a phase distribution for a kinoform for a current replay field to use as the initial phased distribution for the kinoform for the next replay field in the sequence. Embodiments of the kinoform calculation procedure enable the use of the hologram of frame n as initialization for the calculation of frame n+1, discussed further in Bernau, M. "Improved hologram calculation for correlated video frames" International Conference on Consumer Electronics (ICCE), Digest of Technical Papers, pp. 507-508, 2010. Moreover, the inheritance of a parameter used in the hologram calculation from one frame to another can be successfully employed, for example one or more feedback and/or gain parameters. Because the replay fields are relatively similar, this significantly speeds up the procedure. Furthermore, embodiments of this approach provide an important advantage in addressing problems with the dynamic response of a liquid crystal material: it is undesirable when switching from one replay field to another for, for example, the output replay field to effectively flash with noise. By providing a gradual transition, such "noise flashes" can be substantially inhibited.

In a related aspect the invention provides a method of optical telecommunications light beam routing, the method comprising: displaying a kinoform on an LCOS SLM; providing an input light beam to said LCOS SLM; and diffracting said light beam with said kinoform to provide a diffracted output beam from said LCOS SLM; the method further comprising: calculating said kinoform displayed on said SLM using a ping-pong algorithm.

In preferred embodiments the ping-pong algorithm comprises initialising a phase distribution for the kinoform, for example randomly or based on an initial target replay field, calculating a replay field of the kinoform, modifying an amplitude distribution of the replay field but retaining the phase distribution, converting this modified replay field to an updated kinoform and then repeating the calculating and modifying to converge on a desired target replay field. Preferably prior to calculating the replay field the kinoform is modified using a model of the LCOS SLM response, in particular to take account of the limited deformation of the liquid crystal material which limits the phase response of the pixels of the SLM, more particularly inhibiting large changes in phase over a short distance (in pixels) across the SLM.

In preferred embodiments the kinoform is also modified to redistribute the amplitude noise away from a desired position of the output beam in a replay field of the kinoform, for example by increasing the size of the field. In embodiments the procedure may also include a degree of over compensation in the target amplitude replay field, for more rapid convergence of the algorithm.

BRIEF DESCRIPTION OF THE DRAWINGS

These and other aspects of the invention will now be further described, by way of example only, with reference to the accompanying figures, in which.

DETAILED DESCRIPTION OF PREFERRED EMBODIMENTS

Figure 1A:
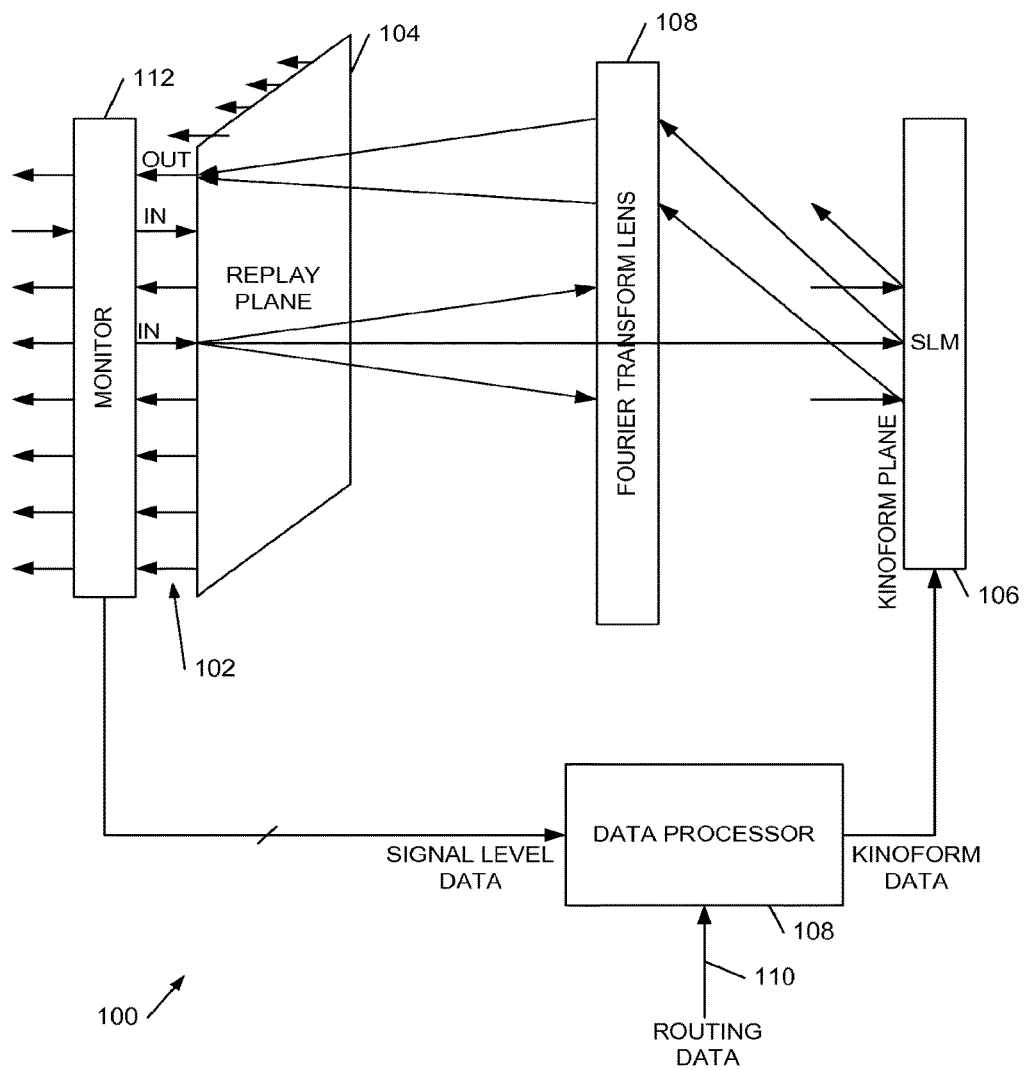
FIGS. 1a, 1b and 1c show, respectively, an embodiment of an LCOS light beam routing device according to an embodiment of the invention, a kinoform calculation procedure which may be employed in the device, and an embodiment of an LCOS light beam routing device incorporating polarization diversity.

Broadly speaking we will describe methods used to compute the pixel patterns to minimise specific problems with using LCOS devices as diffractive optical components in c-band to achieve telecoms standards, more particularly the control of signal beams in the telecommunications c-band by pixilated kinoforms on LCOS devices.

In embodiments the techniques concern the formation, splitting and conditioning of optical signal beams in the telecommunications 1.5 micron wavelength window by means of computer generated holograms comprising patterns of programmable phase-modulating pixels dynamically displayed on suitably designed liquid crystal over silicon (LCOS) devices. In particular, we are primarily concerned with using parallel aligned nematic LCOS devices which provide a phase-only modulation of the reflected light beam with insignificant amplitude modulation. Contemporary versions of such devices have been described in N Collings, T Davey, J Christmas, D Chu, and B Crossland, "*The applications and technology of phase-only liquid crystal on silicon devices*" (Invited Review), IEEE/OSA J Display Techn Volume: 7, Issue: 1, Date: 2011, Pages: 112-119. These devices do not convert the polarisation of the incident light into the orthogonal polarisation in reflection (polarisation crossover).

In particular the techniques concern the improvement in quality of these beams such that they may be efficiently directed into single mode output fibres in a manner that ensures high beam quality and minimum crosstalk of the signal carried in the output fibres, thereby meeting the requirements of telecommunication systems.

To achieve this we use specific techniques to compute the pixel patterns of pixilated kinoforms to be displayed on the LCOS devices used to diffract the signal beams, in particular to resolve the specific problems that arise in reconfigurable dynamic diffractive devices made possible by LCOS technology and operating in the near-infra-red. These applications present special problems as previously outlined in the introduction.

Simple pixel patterns that consist only of periodic gratings displayed on practical LCOS devices do not meet the requirements for efficiency, low noise and crosstalk. We describe pixel patterns which are non-periodic and are generally derived with the aid of iterative computer algorithms, optionally using tailored cost functions, to produce telecommunications devices operating in the near infra-red. The cost functions can be written so that the loss of light into non-selected output fibres (crosstalk) carries a high cost and the resulting hologram will exhibit the very low levels of crosstalk required for a commercial system.

The techniques we describe facilitate: Multicasting, for example making possible multiple functions carried out by one device; the opening up of the full 2D interconnection plane; crosstalk minimisation; aberration correction; and adding new functions to the diffractive structure (e.g. channel equalisation).

In broad terms, the iterative methods used to derive the pixel patterns do not assume periodicity. Thus they intrinsically minimise the limitations caused by fitting periodic pixel patterns into finite pixel arrays. These methods implicitly assume that each pixel has its own discrete phase retardation, i.e. the phase profile is assumed to be quantised and they intrinsically minimise the quantisation noise resulting from the pixel structure. They can recognise that extent of the pixel pattern is finite by allowing optimisation is carried out on the convolution of the pixel pattern with the aperture function of the holograms. An aperture function can be incorporated into the kinoform generation routine to achieve an output amplitude profile designed to maximise the coupling of the beam into the output fibre.

To increase the computation speed, but also to minimise crosstalk and noise, the algorithms may be modified with over compensation and don't care regions. The iterative algorithms may be designed to adaptively adjust the pixel pattern of the pixilated kinoform to accurately position the output beam and the maximise the overlap integral with the output fibre.

Embodiments of these methods also recognise that liquid crystal phase modulators cannot reproduce very high spatial frequencies. The pixel patterns may be optimised under this assumption to minimise light dissipated by deflection into symmetric orders. Further, the pixel pattern may be modified by adding to it an overall phase function to bring signal light to a focus in a different plane compared to either noise resulting from the quantisation of the hologram pattern or residual light in the zero order. This increases the signal to noise of the signal beams, in the latter case allowing the spatial filtering of the zero order light. The pixel pattern may also be modified by adding to it an overall phase function to correct for aberrations or inaccuracies in the optical module.

Still further the methods allow some modification of the wavelength selectivity of the diffracting pattern to achieved, allowing pixilated kinoforms to be designed that show minimum 'roll-off' with wavelength throughout c-band, permitting wavelength agnostic switching within this band.

In embodiments the invention relates to methods to realise an acceptable performance and functionality for programmable pixilated kinoforms having a phase excursion equal to or greater than $2\pi$ (to enable a $2\pi$ range of phase modulation). The pixel patterns are displayed on a Liquid Crystal over Silicon (LCOS) micro-display within a telecommunications module to carry out optical signal processing. The pixel patterns are computed using iterative algorithms and do not consist of periodic gratings but of non-periodic building blocks. They diffract near infra-red light, whose wavelength lies in a communications band, to chosen output locations.

In embodiments of the methods we use algorithms for computing the kinoform pixel patterns in real time that are based on the Fast Fourier Transform algorithm applied to the entire kinoform pixel block. They embody over-compensation and 'don't care regions' to increase efficiency and minimise noise. The kinoform pixel patterns are calculated to take account of the limited deformation that can be suffered by the nematic director of the liquid crystal when an electric field is applied. The kinoform patterns may be modified to allow beam splitting and beam attenuation. The kinoform pixel patterns may also be modified to minimise the wavelength selectivity over the telecommunication band in use. In embodiments we add optical additional optical components modulo $2\pi$ to the phase profile of the main kinoform. We are able to deflect beams in/out of spots and spot arrays.

In embodiments the kinoform is generated in a processor and programmed for representation by the LCOS; it comprises a representation of a phase hologram. As this technique relies on phase only modulation there is no light loss through amplitude modulation. We use a class of algorithm which can compute the kinoform in real time, preferably employing hard wired fast Fourier transform processor(s). The procedure is based on a class of bi-directional iterative optimisation algorithms referred to as ping-pong algorithms (for example IFTA, Gerchberg Saxton). We optimise a random or deterministic phase distribution in the phase (kinoform) plane by mapping it to a second plane where there are known constraints. The distribution is then re-mapped to the phase plane, the amplitude is constrained to unity, and the process is repeated until a satisfactory phase distribution in the phase plane is achieved.

In embodiments we adapt this procedure to employ a method for approximating the one and two dimensional phase profile on an LCOS device to compensate for finite liquid crystal deformation, and use this method to compute the optimum voltage profile on the LCOS electrodes so that the system performance (for example crosstalk and/or stability of the system with changing environmental conditions) is optimised. For example to estimate the liquid crystal profile we can employ a "spring model", in effect a low pass filter (equivalent to convolution with a kernel). The filter's parameters (or convolution kernel) may be calculated using only a pair (in 1D) or four (in 2D) neighbouring pixels. (The behaviour of these two (or four) pixels under various voltages may be simulated using computationally demanding techniques that solve the complex continuum equations, for example Finite Element Methods or Tensor Methods). In embodiments we include such a low-pass (spatial) filter or convolution in the iterative loop for computing the kinoform so that the resulting kinoform is tolerant to a high degree of the LC imperfections and in particular to the inability of the LC to bend significantly.

EXAMPLE IMPLEMENTATION

Referring to FIG. 1a, this shows an embodiment of an LCOS light beam routing device 100 according to an embodiment of the invention. A fibre optic array 102 comprises one or more input fibre optics 102a and a plurality of output fibre optics 102b, with inputs and outputs in a common plane 104 (the kinoform replay plane). An LCOS SLM 106 displays a phase pattern of a kinoform and operates in a reflective mode. A Fourier-transform lens 108 is located between the replay plane 104 and kinoform/SLM 106. The SLM is driven by a data processor 108 which has an input 110 to receive routing data for selecting an optical output. The data processor in embodiments performs the calculations as described below to determine an output kinoform data for SLM 106. In embodiments one or more of the input and/or output beams may be monitored by a beam monitor 112, for example a detector array. The skilled person will appreciate that there are many monitoring techniques which may be employed including, for example, splitting off one fibre optic from another. Additionally or alternatively a separate output port may be provided for monitoring purposes. An output from monitor 112 is provided to data processor 108 for optional use in an initial calibration so that a target replay field function can be adjusted to optimize, more particularly maximize coupling such as an overlay integral between the deflected light beam and the input of a fibre optic.

The data processor 108 implements a kinoform calculation procedure in either software, hardware, or a combination of the two. It is particularly preferred to perform a Fourier transform procedure of the calculation in hardware, for speed/efficiency.

Figure 1B:
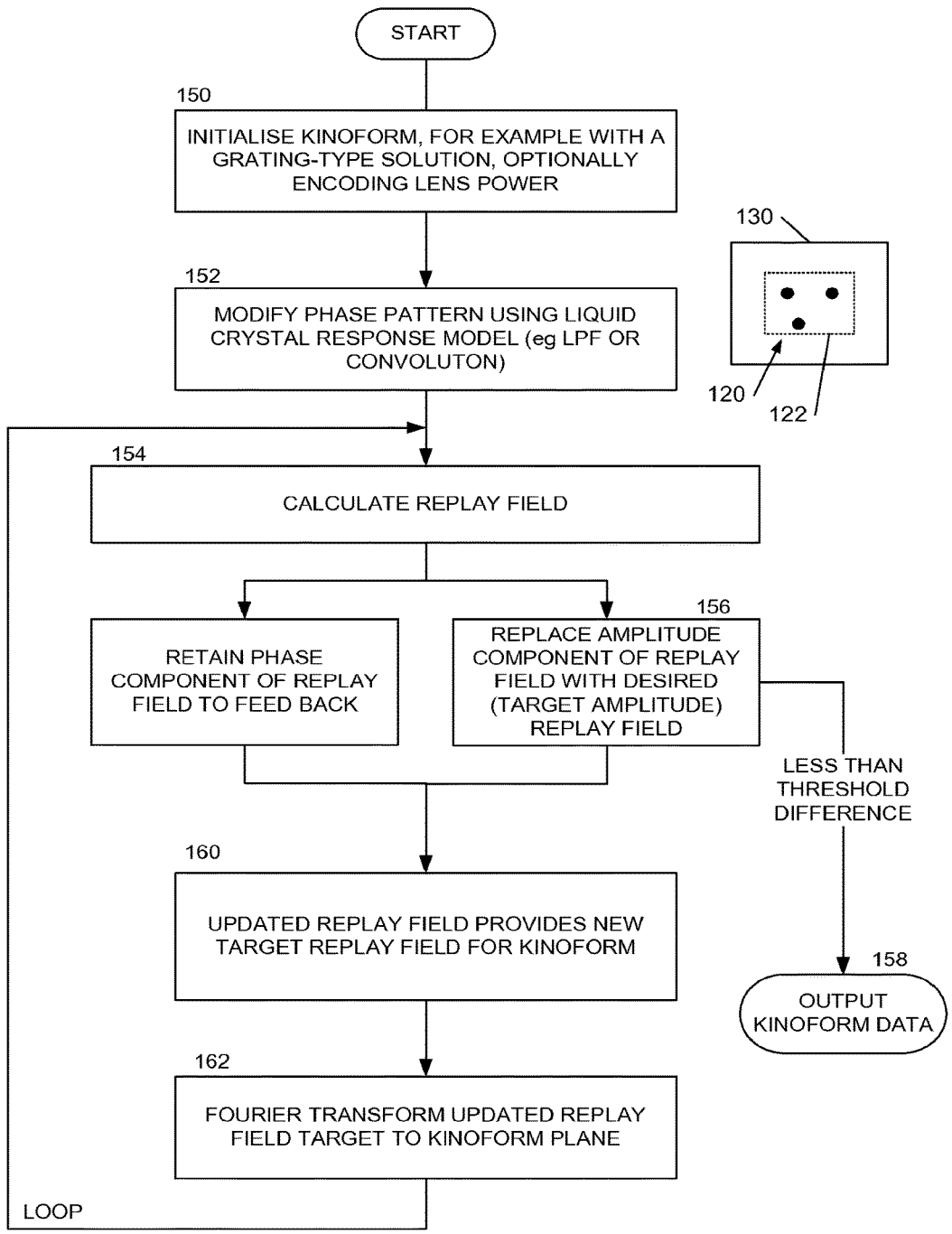

Referring to FIG. 1b, this shows an embodiment of a kinoform calculation procedure which may be employed in data processor 108, according to an embodiment of the invention.

Thus at step 150 phased data for the kinoform is initialised, for example for a grating-type solution in one or two dimensions, since broadly speaking this should correspond to deflection of an input beam to a desired output position. Optionally this initialization may include superimposing a lens on the phase pattern to focus the output beam onto the input of an output fibre optic; a Fourier transform may be employed to implement this. In general this initialization will assume unity amplitude for the output beam, although optionally a different amplitude may be employed, for example to implement channel equalization. Although initializing the phase pattern to a grating-like solution is convenient, this is not essential and in other approaches, for example, a random initialization may be employed.

At step 152 the phase pattern is modified to take account of the liquid crystal response of the LCOS SLM. In embodiments this may be performed by a digital filter (low pass filter) or convolution step, as described in more detail in Georgiou et al (ibid).

Then, at step 154, the data processor 108 calculates a replay field of the kinoform, which comprises a phased component and an amplitude component. The phase component is retained and, in embodiments, the amplitude component is replaced by a desired replay field such as illustrated example 120. For noise reduction this may be expanded 130 beyond a perimeter 122 of the fibre optic outputs.

The step 156 of replacing the calculated amplitude component of the replay field with a desired target replay field preferably also includes a check on whether the difference between the calculated and desired amplitude is less than a threshold level, in which case the procedure has completed and outputs 158 the kinoform data. The skilled person will appreciate that any of a range of different measures may be employed as to whether or not the difference between the calculated and target amplitude components of the replay fields are within a tolerable bound.

If the procedure does not complete then, at step 160, the previous phase component and new amplitude component of the replay field becomes the new target replay field and a space-frequency transform 162, in particular a Fourier transform is performed to convert this to the kinoform plane. The procedure then loops back to step 152, to again modify this new phase pattern by low-pass spatial filtering, to again incorporate the effects of the liquid crystal response. The procedure then continues around a loop, interacting until the desired kinoform data is output.

Figure 1C:
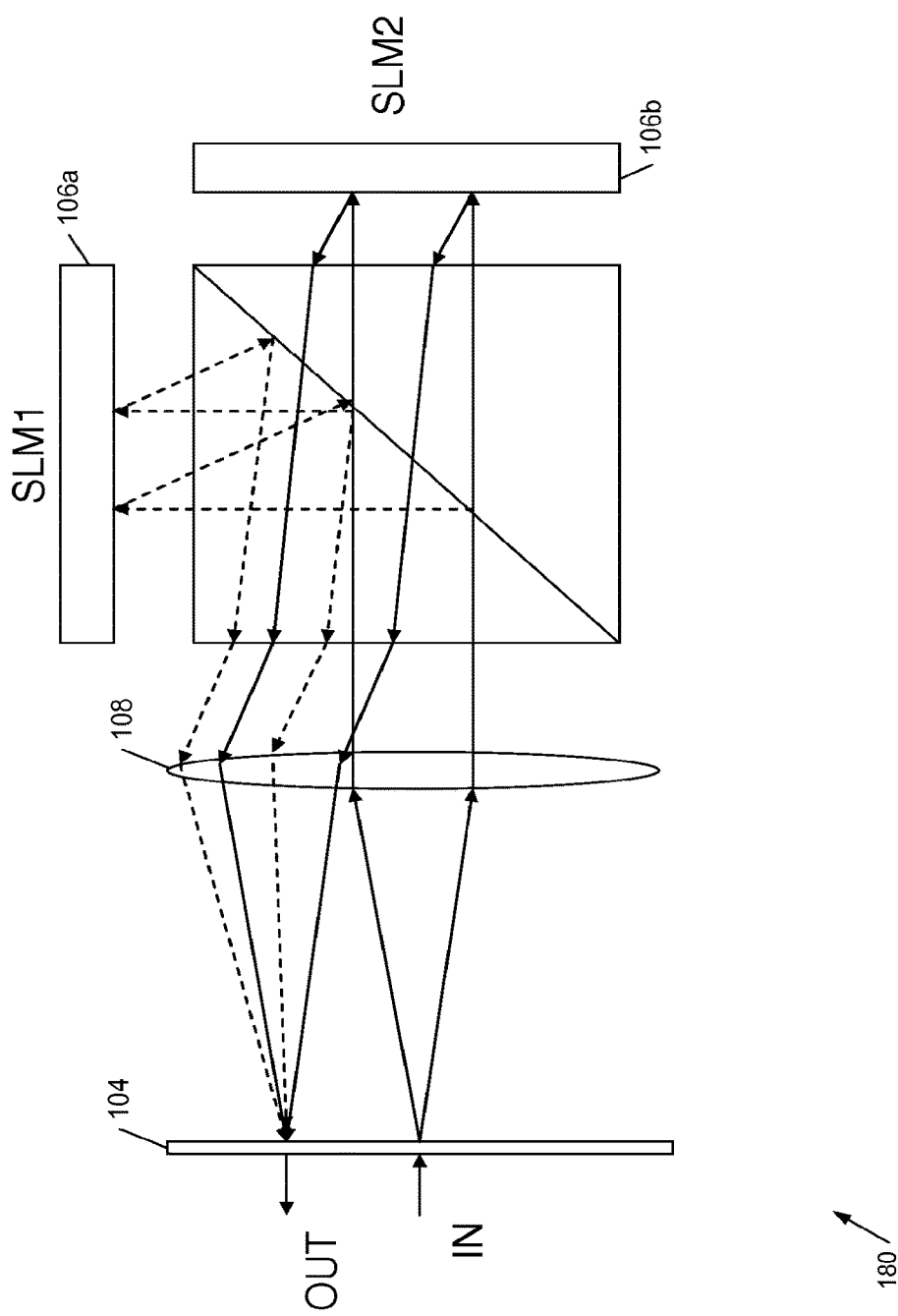

Referring now to FIG. 1c, this shows and an embodiment of an LCOS light beam routing device 180 incorporating polarization diversity. Like elements to those of FIG. 1a are indicated by like reference numerals. In this embodiment a polarizing beam splitter 182 splits the two polarizations of the light into s-polarization incident on SLM1 106a (dotted line) and p-polarization incident on SLM2 106b (solid line). The two polarizations are separately diffracted and brought together again on the output fibre. The alignment of the liquid crystals in the two SLMs is appropriate to the incident polarization.

Further Considerations when Multicasting Optical Interconnects Using LCOS Devices We now describe the characteristics and expected capabilities of an optical interconnect that uses a diffractive Liquid Crystal over Silicon (LCOS) device as routing element. Such an interconnect may be used in a neighbourhood's optical network to distribute high definition television thus avoiding an electronic or optical transmitter for each user. The optimal characteristics of the LCOS device are calculated in terms of pixel number and silicon area and found to be feasible with today's technology. Finally its performance in terms of optical efficiency and number of output ports is evaluated and found suitable for a neighbourhood with 100's of households.

Future optical networks will rely more on optical interconnects. They could be used to restore a network after a link failure, dynamically distribute bandwidth and remotely connect or disconnect users. When fibers to the home (FTTH) are more widely installed optical interconnects will provide a flexible and low cost method for adding or removing high bandwidth users into the network; for example in video signal distribution where a large number of outputs and multicasting is required.

The download rate of any home user will be significantly larger than the upload rate. Therefore the strain in the network will be from the service provider to the user. A television viewer may easily be subscribed to a couple of hundred channels of which he/she wants instant access. If these channels are in 1080p, possibly some with 3D functionality, the bandwidth requirements are significant. In addition, if some users request video on demand, the total number of video channels being delivered in a neighbourhood from the service provider could reach a thousand. Personalized content will be encrypted (similar to a wireless network). With a thousand channels at high definition, the total bandwidth requirement is of the order of Gbps. At this bitrate, the conversion from optical to electrical signal is expensive and is made at the user. Routing the signal in the optical domain eliminates the need for an optical-electrical-optical conversion at the exchange and a high-speed electronic router.

Figure 2A:
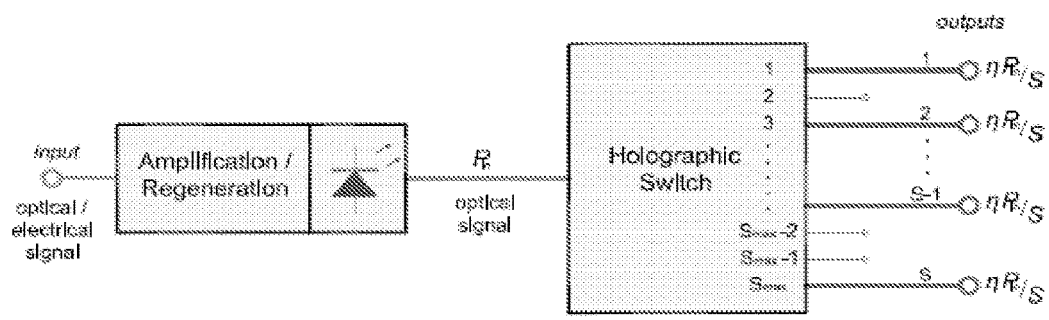
FIGS. 2a and 2b show the position of a holographic switch in an optical network, and the optical arrangement of a holographic interconnect.

FIG. 2a shows how the switch could be used in a HDTV distribution network. By generating a high-power optical signal and then distributing using an optical interconnect the use of an electronic or optical transmitter for each user is avoided reducing hardware and installation costs. In the future, a single powerful laser (of which its polarization is carefully controlled) could provide power to 10's or 100's of users and distributed by an optical interconnect.

Note that liquid crystal materials due to their rod-shaped molecular structure will affect each polarization of the laser in a different way. This is not an issue when the laser source is physically next to the LCOS device and its polarization is set parallel to the liquid crystal molecules. In this case, the polarization effects are controlled and the phase excursion of the incident wave is maximized. Some small polarization modulation may be observed between pixels of different voltage but their effect will be significantly smaller of the fly back effects (discussed later).

The advantage of holographic interconnects over competing technologies is their ability to only route power to the selected ports. Thus efficiency is not affected by the number of potential users, $S_{max}$, but by the number of connected users, S. In a holographic switch the power per output channel is given by $\eta P_{in}/S$ (see FIG. 2a) where $\eta$ is the power efficiency of the interconnect and $P_{in}$ the power input into the switch. This makes holographic switches ideal when the number of potential users, $S_{max}$ is large but at any moment only a fraction of those are connected, like the distribution of video in a neighbourhood. Service providers like to have all households as potential customers, $S_{max}$, but at any moment only a number, S, of them is connected.

Other technologies, can multicast but they base their operation in blocking light from the non-connected users. This brings the power per user down to $\eta P_{in}/S_{max}$ compared to $\eta P_{in}/S$ for a holographic switch. Thus a holographic switch gives the flexibility to have a large number of potential users, $S_{max}$, while not losing any power for this flexibility.

Another advantage of a holographic interconnect it its ability to perform additional functions for the network. The hologram can re-write the phase profile of the beam and thus correcting for defocus, astigmatism or misalignment, thus improving the power coupling into the output fibres. Other functions include channel equalisation, noise suppression and the provision of monitoring channels.

This present an optical arrangement for a system together with theory on holographic switching; the sources of loss in a holographic interconnect and gives a theoretical estimate of the system efficiency; an estimate to the number of output ports possible in a holographic switch; and an overall presentation of the system, suggesting characteristics of the LCOS device.

Holographic Interconnects

Figure 2B:
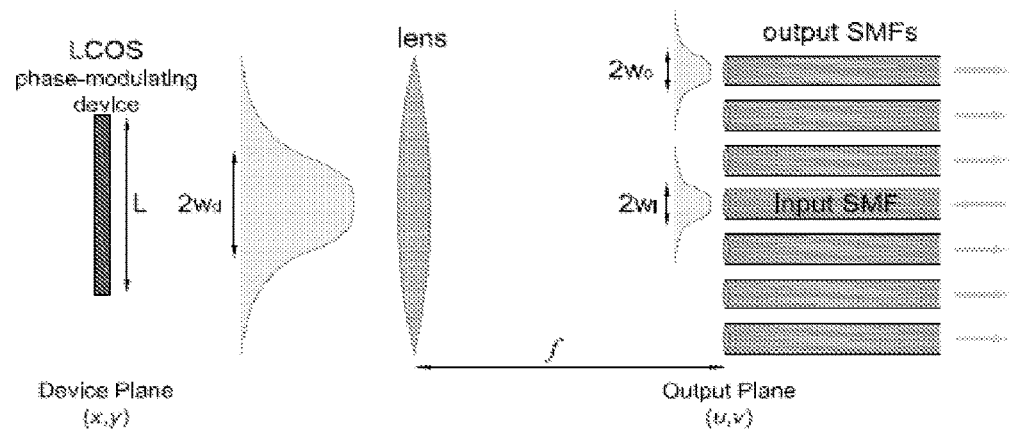

Holographic optical interconnects use diffraction to route light to the target output fibres. FIG. 2b shows an optical arrangement used in holographic interconnects. The beam emerging from the input fibre, with a Gaussian-like profile, expands and then it is collimated by a positive lens. The LCOS device, with dimensions L×L, modulates the phase of the incident beam, introducing high frequency components. The reflected beam is focussed by the lens that in effect Fourier transforms the beam profile. This makes the beam focus to move on a different position or positions depending on the phase pattern on the device.

The illumination profile on the device can be approximated by a Gaussian profile. Its width is given by the Fourier transform of the near field that is also a Gaussian. The two beam widths are related by:

$$2w_d = \frac{4\lambda}{\pi} \frac{f}{2w_i} \quad (1)$$

where f is the focal distance of the lens, $\lambda$ the optical wavelength, $2w_d$ the beam width on the LCOS device and $2w_i$ the beam width of the input source (see FIG. 2). In a Gaussian profile, the beam width is defined as the circle diameter where intensity drops to $1/e^2$ of its peak value.

Figure 3:
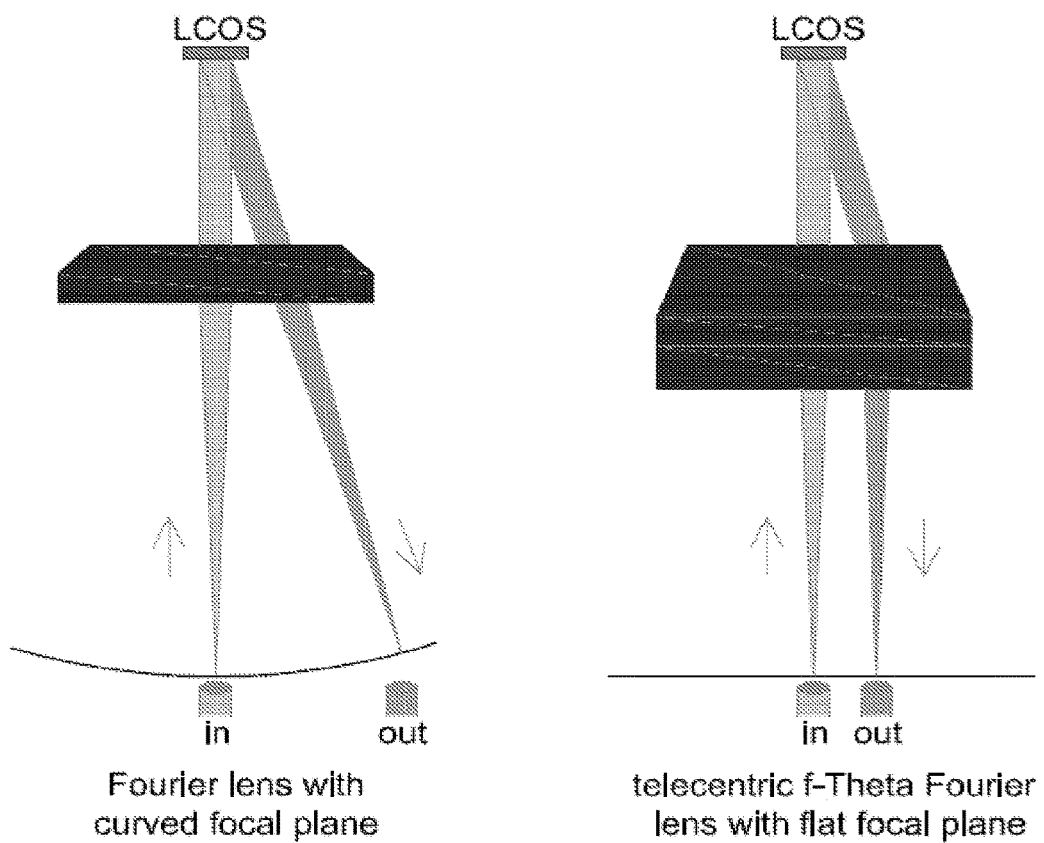
FIG. 3. A suggested arrangement of the input and output fibres (here $S_{max}=192$).

The size of the output beam is also given by Eq. 1. If the beam is not heavily apodised, which is the case to minimise optical losses, $2w_o$, the output beam width is equal to $2w_i$ the input beam width. If the input fibre has the same diameter as the output fibres the output beam would fit exactly into the output fibre. Increasing the diameter of the output fibre relaxes the tight constrains on spot size and positioning and coupling efficiency will improve. This could be done by the use of a multi-mode fibre (MMF), a taper fibre or a microlens. The optical fibres are expected to operate at 1.3 μm, 1.5 μm or 850 nm and be arranged in a rectangular grid as shown in FIG. 3. The input fibre will be placed in the centre of the grid. The LCOS device may have a small tilt in relation to the input fibre to eliminate any unwanted reflections entering back into the input fibre. As the cladding of single mode fibre (SMF) has a 125 μm diameter, the spacing between output fibre cores is also at least 125 μm.

Efficiency

The optical efficiency of an interconnect is defined as the power of the output signal over the input signal. Each user should receive a certain minimum power. Given that input power, $P_{in}$ may not be controlled by the interconnect, efficiency η, determines the maximum number of connected users. Thus high efficiency will allow more users to be connected.

Values of acceptable efficiency vary widely and depend on the application and other functions of the system. MEMS cross connects with efficiencies better than −7 dB have been reported with up to 256 inputs and outputs. However, the particular system has a different role in the network as it may not multicast or broadcast. Because holographic switches can dynamically control the power of each output channel, outputs connected with lossy links may be boosted to achieve fairer power distribution and this will allow more users to be connected.

Efficiency strongly depends on the choice of the appropriate LCOS device. Most commercial LCOS devices are designed for display applications where pixel count is maximised and device area is minimised. Some LCOS devices have been designed specifically for infrared operation, like the Roses. In this work four custom devices are proposed and their performance is evaluated. The first device, refereed to as the LCOS for Optical Infrared Switching (LOIS), is larger in terms of active area and has fewer pixels compared to most commercial devices. Scaled down versions of LOIS, the mLOIS, μLOIS and nLOIS are also considered. In addition a number of commercial devices are presented and are shown together with the proposed ones in the Table below.

| Device Name | Δ/μm | g/μm | N | F | L/mm | Area/mm² | Dimensions | Manufacturer |
|---|---|---|---|---|---|---|---|---|
| LOIS | 18.0 | 0.25 | 1024 | 0.97 | 18.4 | 339 | 18.4 × 18.4 | — |
| mLOIS | 18.0 | 0.25 | 720 | 0.97 | 13.1 | 169 | 13.2 × 13.2 | — |
| μLOIS | 18.0 | 0.25 | 512 | 0.97 | 9.2 | 85 | 9.1 × 9.1 | — |
| nLOIS | 18.0 | 0.25 | 164 | 0.97 | 2.9 | 8.7 | 2.9 × 2.9 | — |
| 4K2K D-ILA | 6.8 | 0.25 | 2400 | 0.93 | 16.3 | 364 | 16.3 × 26.1 | JVC |
| BR1920HC | 9.5 | 0.40 | 1200 | 0.92 | 11.4 | 208 | 11.4 × 18.2 | Brillian |
| JVC Professional | 9.5 | 0.45 | 1080 | 0.91 | 10.3 | 187 | 10.3 × 18.2 | JVC |
| Qualia | 9.0 | 0.35 | 1080 | 0.92 | 9.7 | 168 | 9.7 × 17.3 | Sony |
| JVC Consumer | 8.1 | 0.45 | 1080 | 0.89 | 8.7 | 136 | 8.7 × 15.6 | JVC |
| Sony XBR | 7.0 | 0.35 | 1080 | 0.90 | 7.6 | 102 | 7.6 × 13.4 | Sony |

The optical loss, not directly linked with the holographic nature of the interconnect is not considered here. These include back reflections, mirror reflectivity and coupling losses. Note that the efficiency of the switch could be significantly affected if the optical system and the fibre array are not designed appropriately.

Figure 4:
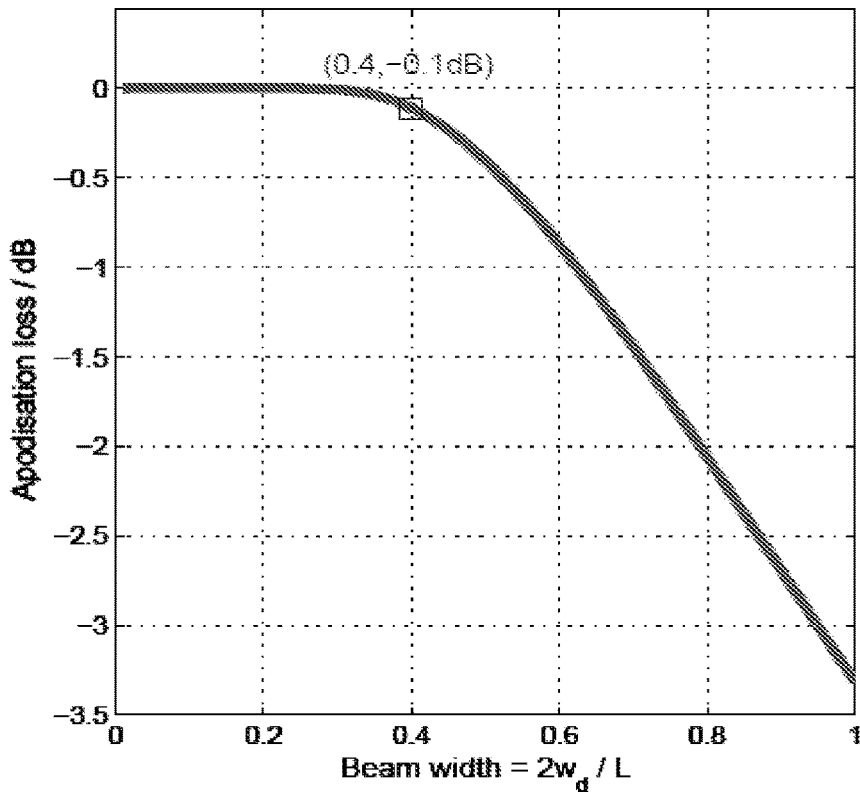
FIG. 4. A telecentric f-theta lens will focus the beam at normal angle to the focal plane, its position will be proportional to the input field angle and the focal plane is flat.

Thought the hologram can deflect the beam by a range of angles the Fourier lens should be diffraction limited for all the range. In addition, the launch angle into the output fibres should be normal to maximize insertion efficiency. Aspheric lenses with these characteristics include telecentric F-theta lenses. They can ensure that the beam incidents on the output fiber array at normal angle (telecentric operation) and that the position of the focus is proportional to the field angle (F-theta operation). In addition, the focal plane is flat instead of curved. This is shown graphically in FIG. 4. An alternative way to eliminate the issue of the oblige incidence is to use a second hologram that deflects the beam in the opposite direction by the same amount. This arrangement, router-selector architecture, is used to transform the switch into a crossbar switch.

Another challenge is the construction of the densely packed array shown in FIG. 3. Such an array is feasible but it is likely to be an engineering challenge. Nevertheless, waveguide technology has been constantly improving. Waveguides with fifty thousand fibers are commercially available (e.g. Sumitomo Image Guide IGN-20/50) and used for optical fiber image guides with core spacing of less than 10 µm. Fibers, and especially fiber arrays, will have their core slightly misplaced and if this is not considered, efficiency will be further reduced. There are a few ways to minimize and even eliminate the issue. The hologram can use heuristic techniques to identify the exact centre of the fiber and then reconfigure for the revised positions. This should include some kind of feedback from the fiber. Another way to address this issue is to increase the diameter of the SMF using a taper fiber or a micro-lens. This technique has the advantage that the effective diameter of the core increases while the fiber remains single mode.

Finally, a MMF may be used though it may not always be desirable to use both SMFs and MMFs in the same network. Nevertheless, for short distances the MMF may be the most cost effective solution in terms of hardware.

The losses considered here are associated with the (i) device fill factor (ii) beam apodisation (iii) hologram efficiency and (iv) phase-rendering. In the following four subsections these losses are considered in detail.

Apodisation

Figure 5:
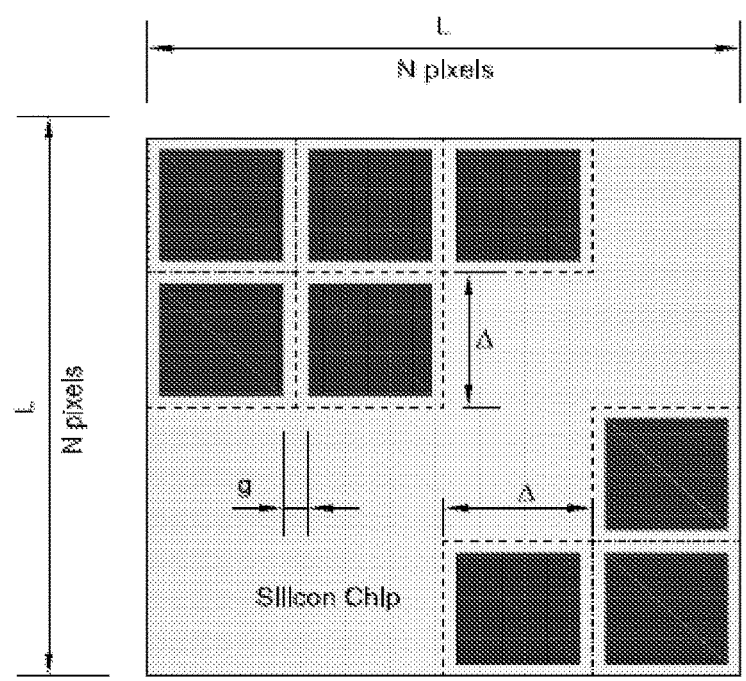
FIG. 5. The apodisation losses as a function of the beam diameter.

Apodisation losses refer to the trimming of the Gaussian profile by the LCOS device. The amount of apodisation is determined by the focal distance of the lens: a large focal distance will create a broad Gaussian function with large trimming of the profile. There is a trade-off in choosing the optimal focal distance. It is desirable to minimise losses by having small f and concentrating more power on the device. At the same time it is also desirable to use all the available pixels because this increases the number of output ports. Given the importance in optical efficiency it may be appropriate to use more silicon area rather than increase loss. Apodisation also changes the size and the shape of the focal points reducing power coupling into the output fibres. Limited beam shaping is possible by using the LCOS device. The amount of energy landing on the active area of the device, $P_d$ is given by:

$$P_d = \frac{1}{w_d \sqrt{2\pi}} \int_{-L/2}^{x=+L/2} \int_{-L/2}^{y=+L/2} e^{-(x^2+y^2)/2w_d^2} dx dy \quad (2)$$

where $w_d$ is a function of focal distance, f. The apodisation loss for different focal distances was calculated by integrating the power over the square area of the device using the above integral. FIG. 5 shows this variation with the horizontal axis showing the beam size in comparison to the device size and the vertical axis the optical loss. It can be seen that for a beam width of about 0.4L the apodisation is very small and less than −0.1 dB. Above this, apodisation loss is significant. Thus it is recommended that the beam width is about 0.4L.

Fill Factor

Figure 6:
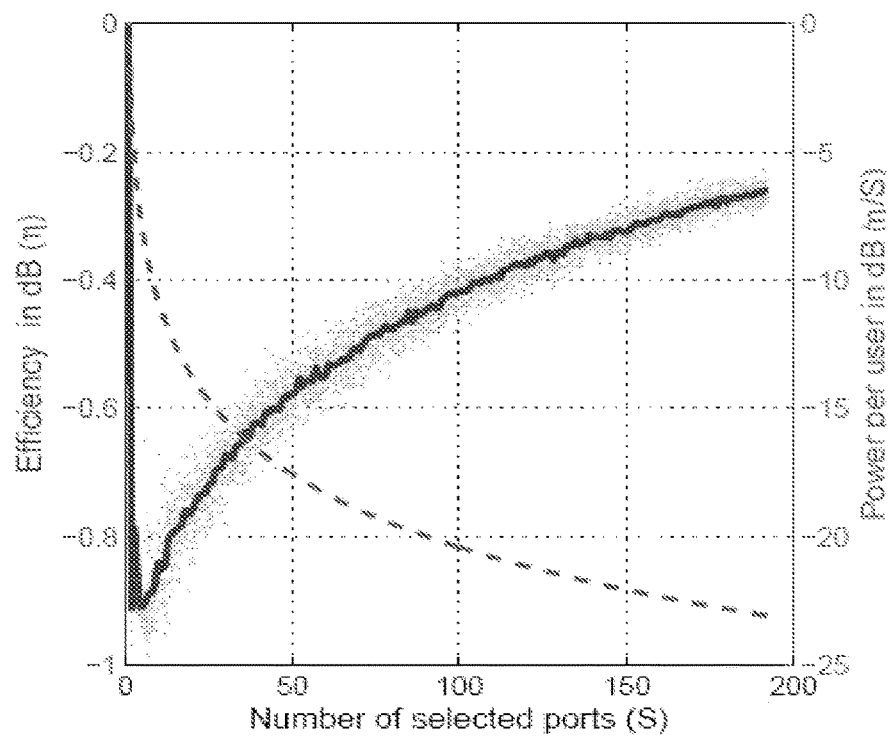
FIG. 6. The dimensions of an LCOS device designed for holographic optical interconnects.

LCOS devices are silicon devices in which a layer of reflective metal, like aluminium, is deposited on top of the silicon backplane. Pixels act both as mirrors and electrodes thus they should be separated by a non-conductive area, refereed to as inter-pixel gap or dead-space. In commercial devices, this space can be as low as 0.25 µm. Note that devices with dielectric mirrors may have zero inter-pixel gap but the associated fringing fields are significant. Inter-pixel gap reduces the average reflectivity of the device by a factor F, the fill factor, which is equal to $$F = \left(\frac{\Delta - g}{\Delta}\right)^2 \quad (3)$$

where $\Delta$ is the pixel pitch in the x and y direction on the device plane and g is the inter-pixel gap as shown in FIG. 6. Both inter-pixel gap and pixel pitch are the same in both directions.

For a rectangular device with active area L×L and N×N pixels the fill factor can also be expressed as $$F = \left(1 - \frac{g}{L}N\right)^2 \quad (4)$$

In this equation, the inter-pixel, g, is fixed by the lithographic process. The dimensions of the active area, L, heavily affects the cost of the device and thus it is also constrained. Only the number of pixels, N, may be treated as a free variable when optimising the system. Increasing the number of pixels for a fixed silicon area will increase the number of the output fibres (smaller pixels thus larger deflection angle) but will also increase the fill factor losses. Thus for a given number of outputs, the minimum number of pixels should be used.

Despite the large cost of silicon per mm² an interconnect will have a higher value and longer lifetime than a consumer appliance allowing larger silicon devices. Increasing the size improves fill factor and the overall efficiency of the system. It is proposed that LOIS has only 1024 pixels but an active area of 18.4×18.4 mm thus having a fill factor loss of only 0.15 dB.

Hologram Efficiency

Hologram efficiency here refers to the theoretical maximum energy a phase-only hologram can deliver to the target positions. The hologram can modulate only the phase of the incident beam and not its amplitude. This introduces ghost orders that reduce the diffraction efficiency. Depending on the arrangement of the output ports the diffraction efficiency of the hologram may vary from 0 dB (for a blazed grating) to about −1 dB (see FIG. 7).

There is not an analytical way to calculate the exact hologram diffraction efficiency for any arbitrary port arrangement. However, the worst case scenario is for two output ports when the diffraction loss can be analytically calculated and it is equal to 2 sin c(π/2) or −0.9 dB (this is found in the same way as the efficiency of a binary-phase hologram, see above). Increasing the number of multicasting outputs, reduces the power per output fibre, $\eta P_{in}/S$ but improves the overall efficiency, $\eta$. The best case scenario is when there is only one output, in which case the diffraction efficiency is unity.

Figure 7:
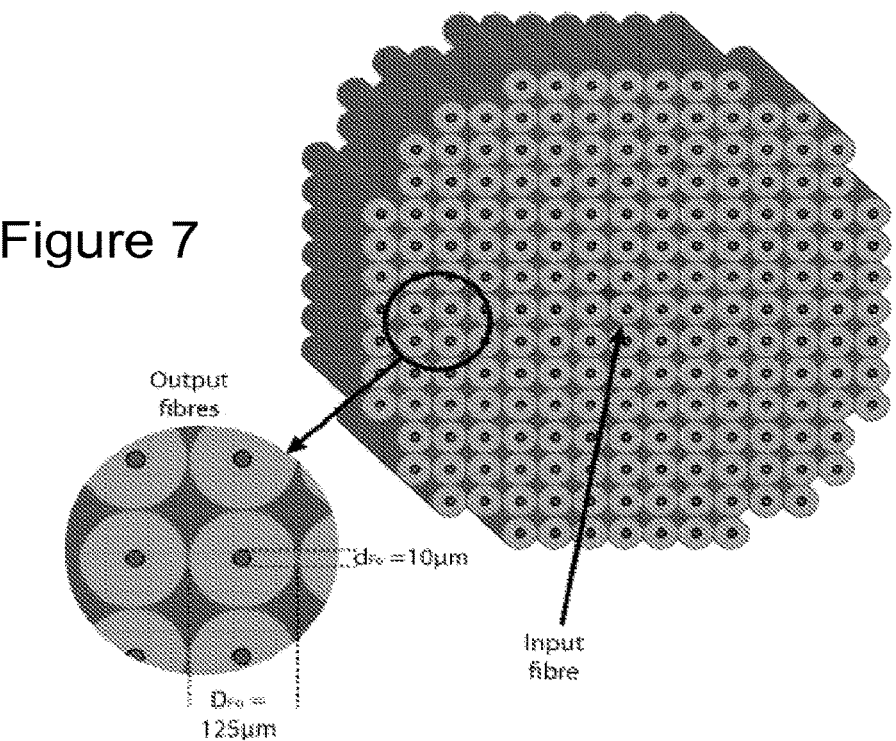
FIG. 7. Hologram diffraction efficiency versus number of output users. Efficiency increases thus making holographic interconnects best suited for networks with many users.

In order to estimate the ideal diffraction efficiency of the system, a number of holograms were computed using the Output Plane Phase Optimisation (OPPO) method and Direct Binary Search (DBS). The number of selected output ports, S, was varied from 1 to 192. For each S, 40 different combinations of output fibres were made and for each combination a hologram was designed to route light to them. The output fibres were placed on a regular grid of 15×15 with the central fibre of the grid being the input as shown in FIG. 3. Eight fibres on each corner were not used in order to form a more circular arrangement. Thus the total number of output fibres was 192. The solid line in FIG. 7 shows the mean diffraction efficiency for any number of spots from 1 to 192. The dots show diffraction efficiencies of individual holograms. It can be seen that the optical loss is always better than −1 dB and improves as the number of output channels increases. The grey line shows the energy per user. The power per user is not constant but increases as the number of user decreases thus making better utilisation of the available power.

Note that if necessary the hologram design can reduce the crosstalk of the interconnect down to acceptable levels. This can be done in a number of ways. First, all predictable imperfections of the system may be included in the hologram design algorithm and their effect eliminated. These include phase quantization, pixilation, inter-pixel gap and even the fringing fields between neighboring pixels. Non-predictable errors, like device flatness, thermal drifts and misalignments can be minimised by adding the appropriate Zernike coefficients on the LCOS device. Many authors have investigated ways to calculate in real-time these errors and compensate for them. Finally, the great strength of holograms lies in the fact that most device imperfections will be transformed into the Fourier domain thus they are likely to arrive either on the zero order or as high frequency component noise. Currently one-to-one optical switches are used as commercial systems and their performance in terms of crosstalk is acceptable.

Phase Rendering Losses

Real LCOS devices do not render the phase profile perfectly thus additional optical losses are introduced. There are three main sources of phase errors in a device: spatial quantisation or pixelation, phase quantisation and electric field fringing.

Spatial Quantisation

Square pixels on an LCOS device act as apertures forming a far field on the output plane. All pixels have the same shape but are shifted in space. Space shifting on the hologram plane translates to phase shifting in the output plane. Therefore on the output plane the far field of each pixel will have the same amplitude and position but different phase. Adding the effect of all pixels together, it will form a far field amplitude envelope with the same shape as the far field of a single pixel. The far field of a square pixel is a two-dimensional sin c function and it is given by:

$$\eta_{sin\ c} = F\ \text{sin}\ c^2(uK)\text{sin}\ c^2(vK) \quad (5)$$

where K is given by:

$$K = \frac{\pi\Delta}{\Delta - g} \quad (6)$$

and u and v are the normalised horizontal and vertical coordinates on the output plane. The normalised coordinates of the output plane are unity at position if or at deflection angle at position $\frac{\lambda}{\Delta}f$ or at deflection angle $\frac{\lambda}{\Delta}$.

Figure 8:
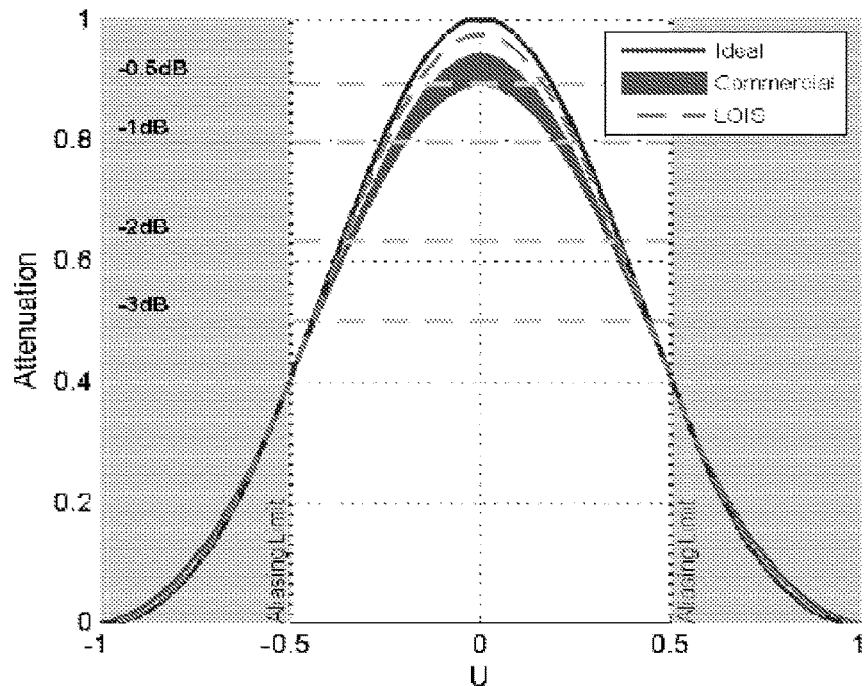
FIG. 8. The sin c envelope formed at the output plane due to the square pixel shape. Keeping fibres near the centre reduces attenuation.

FIG. 8 shows the sin c envelope in one dimension when the fill factor is unity (solid line). The thick gray line shows the range of attenuation with the commercial devices shown in the Table above, and the dotted line for the four LOIS devices. The horizontal line shows the normalised deflection angle. The maximum normalised deflection angle in a holographic interconnect is ±0.5 when the period is two pixels. Above that spatial frequency, aliasing occurs.

Figure 9:
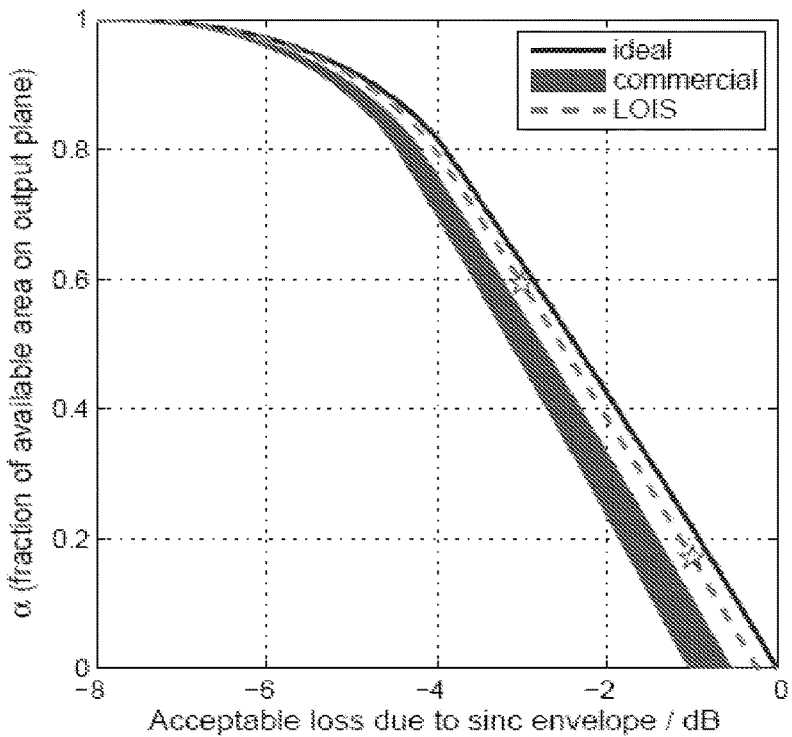
FIG. 9. The two-dimensional sin c envelope attenuation as a contour map.
Figure 10:
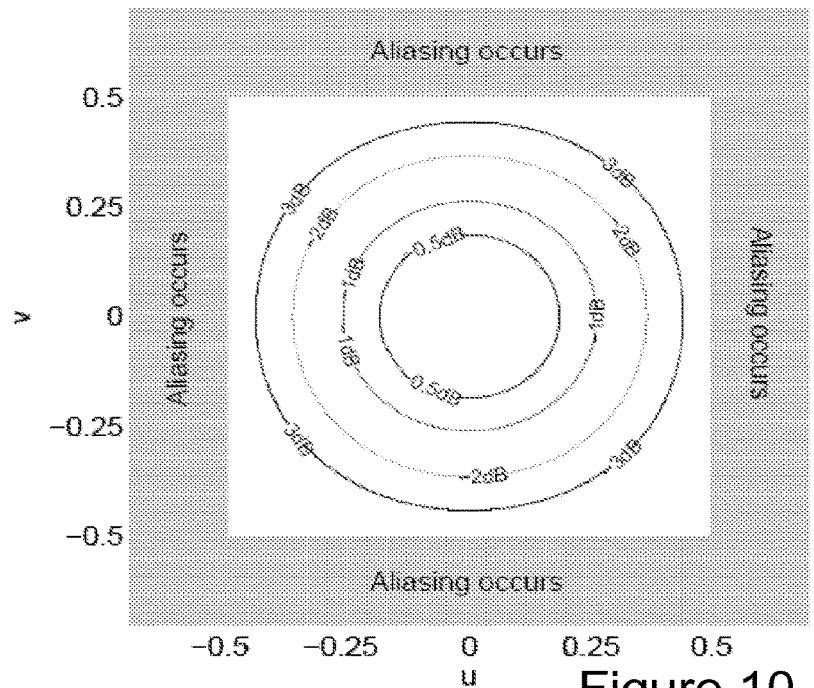
FIG. 10. The acceptable loss due to the sin c envelope as a function of useful area fraction. The two stars correspond to the proposed points of operation for the LOIS device.

In two dimensions the sin c envelope will form a top hat function. The nearer to the center a beam is deflected, the less the attenuation. Since the area available on the output plane is limited, the more ports are placed the more attenuation should be sustained by the ports further away form the zero order. This is shown on a two-dimensional contour map in FIG. 9. It corresponds to the ideal case when fill factor is unity. It shows that if a maximum −0.5 dB loss is acceptable due to the sin c envelope, only the area of the central contour may be used. This corresponds to a fraction of 0.15 of the total output plane area. The ratio of the area where output ports may be placed over the total area will be denoted by the parameter α. If higher loss is acceptable, α is larger. For an acceptable loss of −3 dB, α is about 0.6 and this increases the area of the useful output plane and the number of the output ports. Loss for real devices will be lower due to reduced fill factor. The amount of available area for a given efficiency reduction due to the sin c envelope is given in FIG. 10.

Phase Quantisation

Phase quantisation is caused by the limited palette of voltages the silicon backplane can provide. In general, a digital-to-analogue converter (DAC) will provide the analogue voltage driving the liquid crystal cell. More phase levels will increase the complexity of the DAC and could reduce its speed. Therefore, it is important to design a chip with the least possible number of phase levels.

For a general multicasting hologram the efficiency reduction due to phase quantisation cannot be calculated analytically. However, the efficiency $\eta_{pq}$ of a phase-quantised blazed grating can be calculated and it is equal to:

$$\eta_{pq} = \left[\int_{-\pi/p}^{\theta=\pi/p} \cos(\theta)d\theta\right] \Big/ \left[\int_{-\pi/p}^{\theta=\pi/p} 1 d\theta\right] \quad (7)$$

$$= \text{sinc}\left(\frac{\pi}{p}\right) \quad (8)$$

where p is the number of available phase levels and θ corresponds to the phase delay introduced by a pixel relative to the phase of the target spot. The first square parenthesis gives the intensity of the beam when there were only p phase levels and the second square parenthesis when there are infinite phase levels. Efficiency is the ratio of the two.

Figure 11:
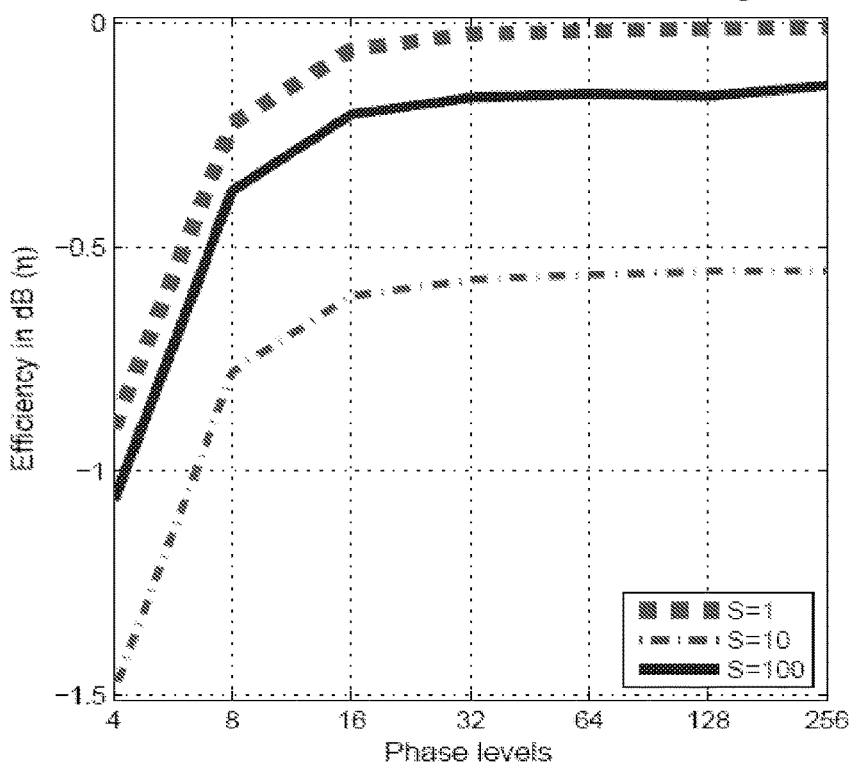
FIG. 11. The diffraction efficiency of a phase quantised hologram. From the top, efficiency for a single spot, a 100 and a 10 spot generating hologram.

The effect of phase quantisation for holograms with more than one output was estimated by computing holograms with different quantisation levels and then comparing their performance. This is shown in FIG. 11 for holograms with one, 10 and 100 output ports. Each efficiency point was calculated from 15 different holograms with 1024×1024 pixels. Loss due to phase quantisation is negligible above 32 phase levels. It is therefore suggested to use at most 32 phase levels or 5-bits per pixel.

Fringing Fields and Liquid Crystal Deformation

The phase modulation in an LCOS device occurs in the liquid crystal material that is being rotated to the desired orientation by the electric field. FIG. 3 shows a cross section of the liquid crystal layer on an LCOS device. As the thickness of the liquid crystal cell increases the electric field between the pixels increases compared to the field between the pixel and the top electrode. This creates a smoothing effect for the phase profile that is affecting large phase transitions on the hologram, especially the $2\pi$ phase jumps of a blazed grating. This $2\pi$ phase jump is usually referred to as flyback.

Calculating the liquid crystal behaviour on a large hologram with about a million pixels is computationally difficult. It requires the solution of the continuum theory equations for the entire device. There are a few computationally efficient approximations to estimate the behaviour of the liquid crystal. In this paper we use the low-pass filter approach, in which the phase profile is estimated by convolving the ideal profile with a kernel. The shape and width of the kernel is found by solving the continuum theory equations for two neighbouring pixels using a Finite Element Method (FEM) software.

The effect of electric fringing field, and thus the width of the kernel, increases as the thickness of the cell. So it is important to have as thin cell as possible but that achieves $2\pi$ phase modulation. In practise larger phase excursion is used to reduce the maximum rotation angle of the liquid crystal and increase speed. The thickness of the cell for a $\varphi$ maximum phase excursion is given by:

$$d = \frac{1}{2} \frac{\varphi}{2\pi} \frac{\lambda}{\Delta n} \qquad (9)$$

where $\Delta n$ is the birefringence of the liquid crystal. The term ½ arises because the device operates in reflection thus the wave is modulated in the way in and in the way out. For a $2.5\pi$ phase modulation, 1.55 μm wavelength and using E7 liquid crystal the cell thickness is 4.8 μm. Simulating this device using continuum theory in a FEM software gives the kernel of the low pass filter.

Figure 12:
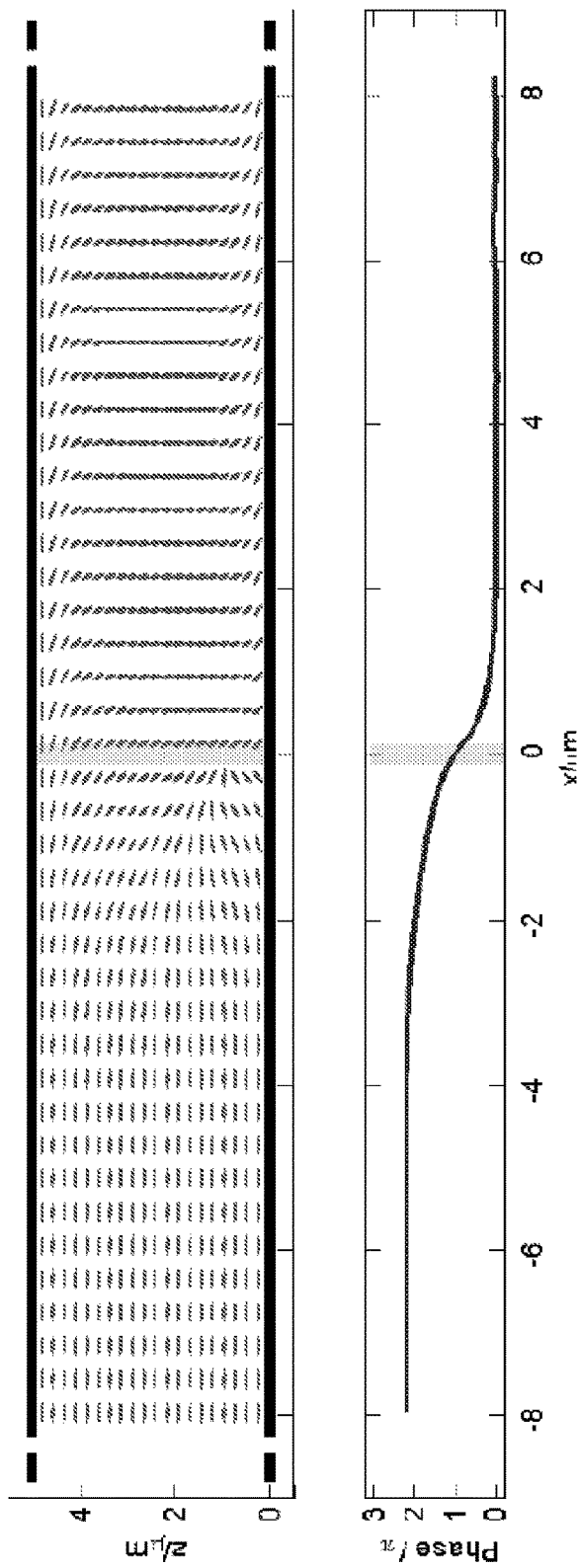
FIG. 12. The diffraction efficiency of a blazed grating with and without fringing fields for a device with the characteristics of LOIS.

Using this one-dimensional kernel, the efficiency of a blazed grating with all possible deflection angles was found and it is shown in FIG. 12. Fringing fields affect the diffraction efficiency of the grating but the difference between the ideal sin c envelope efficiency (dotted line) is small and never more than −0.5 dB. If both dimensions are considered, the maximum loss will be −1 dB. The maximum discrepancy between the two curves occurs when the period is roughly four pixels, i.e. the normalised deflection angle is 0.25.

Two factors make FIG. 12 to show the worst case scenario. First, in a blazed grating the entire area of all the pixels contribute to the output port, and thus efficiency is unity. Any discrepancy will certainly create a profile with lower efficiency. For any other hologram, each pixel contributes to many output ports and a discrepancy in its phase will have a smaller effect into the output (this was verified by adding random noise to a blazed grating and a multicasting hologram and the effect on the latter was less). Second, part of the fringing fields occur on the pixel boundary, were some of the loss has already been accounted by the inter-pixel gap. As the size of the inter-pixel gap is smaller than the wavelength and the propagation distance within the liquid crystal considerably more, the effect of the inter-pixel gap cannot be easily accounted for (it can be accounted by solving the Maxwell equations within the anisotropic liquid crystal and the metal electrodes).

Fringing fields do change the shape of the sin c envelope on the output plane as it can be seen from FIG. 12. Consequently, so does the variation of α as a function of loss.

Figure 13:
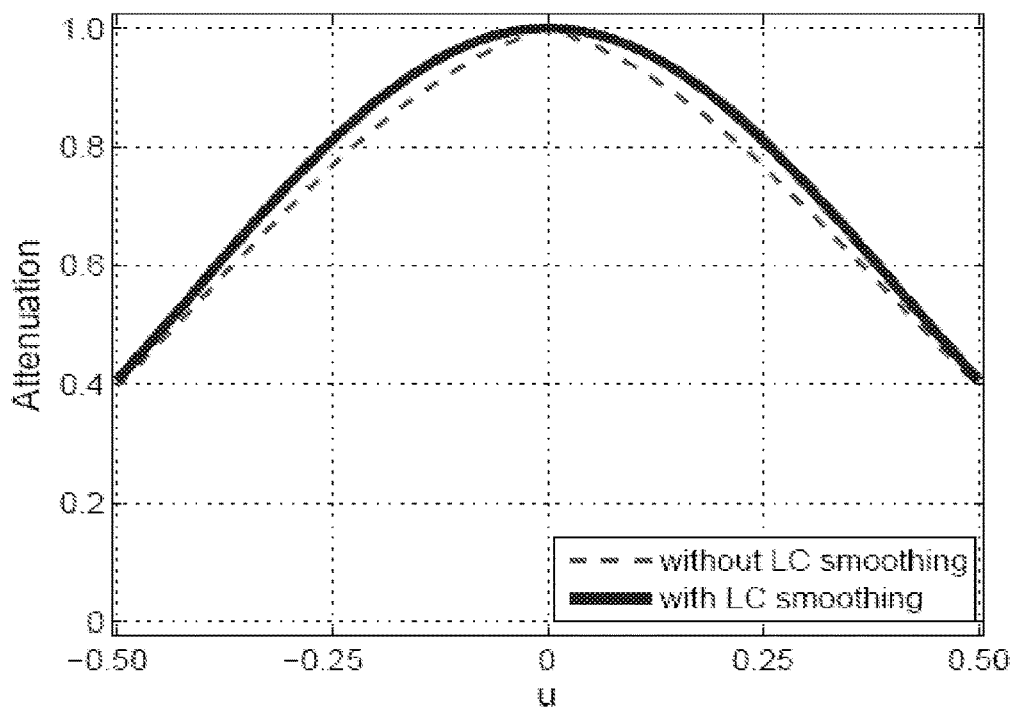
FIG. 13 shows The diffraction efficiency of a blazed grating with and without fringing fields for a device with the characteristics of LOIS.

This change, which is rather small, is accounted together with the sin c envelope in the Results and Discussion section below. FIG. 13 shows the diffraction efficiency of a blazed grating with and without fringing fields for a device with the characteristics of LOIS.

Output Ports

The number of selected output fibres in a holographic interconnect is restricted by the diameter of the fibres and the accessible area on the output plane. The positioning of the output spots can be done with high accuracy by the hologram but the point spread function (PSF) of the spot, i.e. size of the spot, should be the same size or smaller to the core of the output fibres ($d_{Fo}$). The area occupied by the cladding of the output fibre, with diameter $D_{Fo}$, takes useful space but no output ports can be placed there. Assuming a rectangular grid, each output port will occupy $D_{Fo} \times D_{Fo}$ area on the output plane (see FIG. 3).

The area of the entire output plane is given by the maximum deflection of the hologram which is $$u_{max} = \pm \frac{\lambda f}{2\Delta} \text{ or } u_{max} = \pm 0.5 \left( N \frac{\lambda f}{L} \right) \qquad (10)$$

giving far field area of $(N\lambda f/L)^2$. However, the useful area of the output plane is less because parts of the far field are highly attenuated by the sin c envelope. If only a fraction a of the far field area is used, then efficiency is increased because the high-attenuation area is not used. This gives a total number of output fibres, $S_{max}$ equal to $$S_{max} = \alpha \left( \frac{N(\lambda f)}{L D_{Fo}} \right)^2 \qquad (11)$$

The wavelength and the focal distance terms may be eliminated by considering that the size of the output spot, $2w_o$, should be smaller or equal to the output fibre core size, $d_{Fo}$, such that $$2w_o = \frac{4\lambda}{\pi} \frac{f}{2w_d} \leq d_{Fo} \Rightarrow \lambda f \leq \frac{\pi}{4} 2 w_d d_{Fo} \qquad (12)$$

giving the maximum number of output ports to be $$S_{max} = \alpha \left( \frac{\pi}{4} \right)^2 \left( \frac{d_{Fo}}{D_{Fo}} \right)^2 \left( \frac{2w_d}{L} \right)^2 N^2 \qquad (13)$$

The above equation contains five factors. The first factor, α, state that the number of output ports, $S_{max}$, can increase by reducing the efficiency of the system. The second factor, $$\frac{\pi}{4}$$

is determined by the packing factor of the fibres and it is equal to the ratio of the fibre's cross section area over the area of a circumscribed square (for hexagonal packing this ration will be $$\frac{\pi}{2\sqrt{3}},$$

an increase of 15%). The third term is determined by the relative size of the core to the cladding. For a single mode fibre this is about $$\frac{10 \ \mu m}{125 \ \mu m}.$$

The fourth term is determined by the apodisation. Assuming the optimum apodisation is used, it will be equal to 0.4. Finally, the last term $N^2$, is the total number of pixels on the device.

It is interesting to note that the number of output ports is not a function of the wavelength or the focal length. It can also be increased by any amount by increasing the number of pixels but it should also be accompanied by a suitable increase of the LCOS active area, L×L, to keep α and thus the losses constant.

Discussion

In the previous sections the parameters affecting the performance of a holographic interconnect were determined. In this section the system is considered as a whole and its characteristics are discussed with relation to different applications.

Area

The active area of the device is possibly the most important parameter of the LCOS device as it directly affects number of pixels, number of output ports and cost. The cost of a device is directly linked to its area with large devices being disproportionately expensive. As a guide, commercial silicon chips should be sufficiently small to keep the throughput high. The Intel Xeon x7460 processor for example has 503 mm² die area and Intel Xeon x5405 has 214 mm² area. The JVC 4k LCOS device has active area of 546 mm². The proposed devices, have active area of ranging from 340 mm² to 9 mm². Even the top range LOIS device, with 340 mm² area, it is within the limits of current fabrication techniques, in terms of silicon area and cost. Note that the LCOS device in an optical interconnect would be only a small fraction of the cost. Installation, infrastructure and other equipment will dominate the costs. This is unlike computers and projectors where the product price is dominated by the cost of CPU and the LCD respectively.

Number of Pixels

If a small LCOS device is required, the area can be halved to 13.2×13.2 mm. This device (mLOIS) would have the same loss by keeping pixel size and pixel pitch the same but half the output ports because of the decreased number of pixels. If even smaller active area is desired, a 9.1×9.1 mm active area would introduce the same losses but with a quarter of the users. The smallest device to consider has a 2.9×2.9 mm active area. It would still have an acceptable number of users and with low cost. Below this size, there will be no substantial cost benefit and the optical design would become complex due to the small size.

Output Ports

When single mode fibres are used for output ports, their outer diameter is $D_{Fo}$=125 µm and the core diameter is $d_{Fo}$=10 µm (see FIG. 3). The beam width on the device is such that $2w_d/L$=0.4. For the proposed LOIS chip, N=1024, L=18.4 mm. The value of α is chosen so that the desired trade off between efficiency and the number of output ports is achieved. For α=0.17 there are 112 output ports available while with α=0.59 there are 390 output ports. For FIG. 3, where there are 192 ports, α=0.30.

The number of ports may be increased or the active area of the LCOS device may be decreased by using a MMF, a taper fibre of a micro-lens in front of a SMF instead of just a SMF. For a short span network, like a small neighbourhood or a large building, where the fibres are only a few hundred meters long, MMF may provide the required bandwidth but with lower cost. When using a MMF, the core is substantially bigger compared with a SMF, 62.5 µm instead of 10 µm. However, the input fibre will remain a SMF with a small core. For the beam of the SMF to match the MMF core, the output plane should be optically magnified while, the spacing of the fibres will remain the same. The result is that more MMF fibres can be placed on the output plane or a smaller device may be used with fewer pixels. If the ratio $$\left(\frac{d_{Fo}}{D_{Fo}}\right)$$

increases by a factor of ×6.25 a similar decrease can occur at N. Therefore the number of pixels can be decreased from 1024 to 164 pixels with an active area of 2.9×2.9 mm and the capabilities of the system in terms of port count and loss will remain as in Table 1.

TABLE 1

The total losses for the LOIS device taking two scenarios: when total loss is −5.2 dB (α = 0.59) and when the total loss is −3.2 dB. (α = 0.17). The number of ports corresponds to a SMF used in the output and increases by a factor of imes6.25² if MMFs are used.

| | Loss | |
|---|---|---|
| | α = 0.59 390 ports | α = 0.17 112 ports |
| Apodisation | −0.1 dB | −0.1 dB |
| Fill Factor | −0.2 dB | −0.2 dB |
| Hologram | −0.9 dB | −0.9 dB |
| Phase Quantisation | −0.0 dB | −0.0 dB |
| Sinc envelope + Fringing fields | −1.6 dB (max - 3.2 dB) | −0.6 dB (max - 1.1 dB) |
| Total loss | −2.8 dB (max - 4.4 dB) | −1.8 dB (max - 2.3 dB) |

Efficiency

Some of the system losses are affected by the number of output ports and some not. All the factors affecting system efficiency are shown in Table 1. Apodisation and fill factor incur the same losses to the interconnect irrespective of the number of output ports (see section 1 and 2). Unlike, the hologram efficiency (section 3 and FIG. 7) is related to the number of output ports. The number of output ports, S is not known so the worst case scenario is considered which is −0.9 dB. The phase quantisation when 5-bits per pixel are used is negligible and can be easily ignored (see FIG. 11). Finally, the sin c envelope attenuation and the fringing field losses should be considered together. The worst case scenario is when the beam is deflected for a maximum angle.

For α=0.59 this attenuation is −3.2 dB while for α=0.17 the attenuation is −1.1 dB. The mean value of loss, which could be more appropriate was also calculated and shown in Table 1. Note that high loss fibres (e.g. long distance between interconnect and subscriber) should be placed towards the centre of the output plane and low loss links on the outer regions. Adding all the losses together, the overall mean efficiency of the system is −1.8 dB if there are 112 ports and −2.8 dB if there are 390 ports. Loss could also be seen as a reduction in the number of users. If the laser source of the system had just enough power for all the output ports, by reducing efficiency the number of users also decreases.

Example System

The final system will depend on the needs of the network. Number of maximum users, $S_{max}$, cost and power available (and thus efficiency) are the three parameters that will determine the characteristics of the LCOS chip. Once the number of users is decided, the relationship between loss (α) and the number of pixels (N) is determined. Increasing the number of pixels while keeping the number of users the same will increase the active area L×L and thus the cost of the device. At the same time α decreases and so do the losses.

The first proposed system will use the LOIS device. Such a device could be used for the backbone of a HDTV distribution system. The input to the switch will be a SMF connected to a laser operating at 1.5 μm or 1.3 μm. It will require less than 100 ports and low losses. Possibly at any point only 10 to 20 outputs are connected thus the power at the output fibres remains high but the system retains the capability to shift the power to any output in case of a link failure.

The second proposed system will also have as input a SMF connected to a laser. However, this system will be used within a neighbourhood and the output ports will have larger diameter (MMF, taper fiber or a SMF with a micro-lens). A 850 nm laser can be used too. The number of users per neighbourhood will be more than 100 and all of them may be connected. The cost of the device will be more important factor as more of these devices will be deployed so smaller LCOS devices will be used. The nLOIS device can be used with loss of −2.8 dB to −4.4 dB and with about 390 ports (α=0.59 in Table 1).

If necessary, a VCSEL may be used as an input to the interconnect. As VCSELS have larger beam width than a laser, the required magnification will be less than ×6.25 when used with SMF. This effectively reduces the number of ports. Devices like them LOIS and μLOIS may be used in this cases when the output ports are MMF and the input is a VCSEL. Also, if the fibre grid has a spacing of 250 μm instead of 125 μm, the number of output ports will also decrease by a factor of four. Fibre ribbons with 250 μm spacing are widely available. Again the mLOIS and μLOIS devices with more pixels can provide the necessary port count for a switch that uses MMF for outputs.

We have thus investigated the use of LCOS devices for multicasting optical interconnects. Mathematical formulae to link the characteristics of the system—efficiency, number of output ports, pixel number and device area—were presented. This enables the optical engineer to best use the resources of the device. A number of devices were presented and it was found that even very small devices with active area of only 9 mm² can be used for multicasting optical signals. Larger devices with areas up to 339 mm² can be used for distributing signals to SMF with very low loss. The number of output ports and thus subscribers is large with more than 100's ports per switch. It can be further increased by enlarging the diameter of the output ports.

Concluding, LCOS devices could be the way to multicast optical signals to the house in the near future. Their cost, flexibility, reliability and large number of output ports make them the ideal solution. As the power of lasers increases and similarly the bandwidth requirements increase, it becomes clear that performing the signal distribution in the optical domain is important and LCOS devices can do that in a very effective way.

Embodiments techniques we have described may also in principle be applied to liquid crystal spatial light modulators other than when in the form of an LCOS SLM. No doubt many other effective alternatives will occur to the skilled person. It will be understood that the invention is not limited to the described embodiments and encompasses modifications apparent to those skilled in the art lying within the scope of the claims appended hereto.

The invention claimed is:

1. An LCOS (liquid crystal on silicon) telecommunications light beam routing device, the device comprising:
   an optical input;
   a plurality of optical outputs;
   a LCOS spatial light modulator (SLM) in an optical path between said optical input and said plurality of optical outputs, for displaying a kinoform;
   a data processor, coupled to said SLM, configured to provide kinoform data for displaying said kinoform on said SLM;
   wherein said kinoform data defines a kinoform which routes a beam from said optical input to a selected one of said plurality of optical outputs;
   wherein said data processor is configured to input routing data defining said selected optical output and to calculate said kinoform data for routing said beam responsive to said routing data; and
   wherein said data processor is configured to calculate said kinoform data by:
   determining an initial phase pattern for said kinoform;
   modifying the phase pattern of the kinoform using a low-pass spatial filter to take account of a limited deformation of the liquid crystal material which limits the phase response of said SLM,
   calculating a replay field of said phase pattern;
   modifying an amplitude component of said replay field to represent a target replay field for said beam routing, retaining a phase component of said replay field to provide an updated replay field;
   performing a space-frequency transform on said updated replay field to determine an updated phase pattern for said kinoform; and
   repeating said modifying, calculating and updating of said replay field and said performing of said space-frequency transform until said kinoform for display is determined; and
   outputting said kinoform data for display on said SLM.

2. The LCOS telecommunications device as claimed in claim 1 further comprising modifying said phase pattern of said kinoform responsive to data defining a model of a response of said SLM prior to said calculating said replay field.

3. The LCOS telecommunications device as claimed in claim 1 wherein said modifying of an amplitude component of said replay field comprises adjusting said amplitude component to reduce a number of iterations of said repeating before a threshold level of difference between said calculated replay field and said target replay field is reached.

4. The LCOS telecommunications device as claimed in claim 1 wherein said modifying of an amplitude component of said relay field comprises replacing said amplitude component with an amplitude component of said target replay field.

5. The LCOS telecommunications device as claimed in claim 1 wherein said data processor is further configured to calculate said kinoform by expanding said target replay field beyond a perimeter defined, in said replay field, by said plurality of optical outputs.

6. The LCOS telecommunications device as claimed in claim 1 wherein said modifying of an amplitude component of said replay field comprises compensating for an envelope amplitude variation in said replay field resulting from the light diffraction pattern from an individual pixel of said SLM.

7. The LCOS telecommunications device as claimed in claim 1 wherein said data processor is further configured to calculate said kinoform by monitoring an optical signal level on at least one said optical output, and adjusting said target replay field, responsive to said monitoring, to optimize coupling between said routed beam and said the selected optical output.

8. The LCOS telecommunications device as claimed in claim 1 employing polarization diversity, wherein said device further comprises a second LCOS SLM, a first optical system to selectively direct light of different polarizations to different respective said SLMs, each displaying a respective said kinoform, and a second optical system to combine said light of different polarizations from said respective SLMs to provide one or more said optical outputs.

9. The LCOS telecommunications device as claimed in claim 8 wherein said first optical system to selectively direct said light of different polarizations said optical system to combine said light of different polarizations comprise a common polarization-dependent beam splitter/combiner.

10. The LCOS telecommunications device as claimed in claim 8 wherein said SLMs do not substantially alter the polarization of a said light beam reflected from said SLM.

11. A method of optical telecommunications light beam routing, the method comprising:
providing an input light beam to an LCOS (liquid crystal on silicon) spatial light modulator (SLM);
calculating a kinoform to be displayed on said SLM using a ping-pong algorithm;
wherein the ping-pong algorithm comprises initializing a phase distribution for said kinoform, calculating a replay field of said kinoform, retaining a phase distribution and modifying an amplitude distribution of a said replay field, converting said modified replay field to an updated said kinoform, and repeating said calculating and modifying to converge on a desired target said replay field;
wherein the ping-pong algorithm further comprises modifying the phase distribution of the kinoform using a low-pass spatial filter to take account of a limited deformation of the liquid crystal material which limits the phase response of said SLM;
displaying the calculated kinoform on said SLM; and
diffracting said light beam with the displayed kinoform to route the input light beam into a diffracted output beam from said SLM.

12. The method of optical telecommunications routing as claimed in claim 11 further comprising modifying said kinoform to compensate for a phase deformation response, of said SLM, to drive data driving said SLM.

13. The method of optical telecommunications as claimed in claim 11 further comprising modifying said kinoform to re-distribute amplitude noise away from a desired position of said output beam in a replay field of said kinoform.

14. The method of optical telecommunications as claimed in claim 11 further comprising adjusting said amplitude to reduce a number of iterations of said repeating before a threshold level of difference between said calculated replay field and said target replay field is reached.

* * * * *